(12) United States Patent
Bullerjahn et al.

(10) Patent No.: US 9,067,825 B2
(45) Date of Patent: *Jun. 30, 2015

(54) METHOD FOR PRODUCING TERNESITE-BELITE CALCIUM SULFOALUMINATE CLINKER

(75) Inventors: Frank Bullerjahn, Leimen (DE); Dirk Schmitt, Leimen (DE); Mohsen Ben Haha, Heidelberg (DE)

(73) Assignee: HEIDELBERGCEMENT AG, Heidelberg (DE)

(*) Notice: Subject to any disclaimer, the term of this patent is extended or adjusted under 35 U.S.C. 154(b) by 0 days.

This patent is subject to a terminal disclaimer.

(21) Appl. No.: 14/238,872

(22) PCT Filed: Jul. 16, 2012

(86) PCT No.: PCT/EP2012/002978
§ 371 (c)(1),
(2), (4) Date: Apr. 29, 2014

(87) PCT Pub. No.: WO2013/023731
PCT Pub. Date: Feb. 21, 2013

(65) Prior Publication Data
US 2014/0283712 A1    Sep. 25, 2014

(30) Foreign Application Priority Data

| | | |
|---|---|---|
| Aug. 18, 2011 | (EP) | 11006757 |
| Oct. 26, 2011 | (EP) | 11008570 |
| Mar. 5, 2012 | (EP) | 12001488 |
| Mar. 26, 2012 | (EP) | 12002111 |
| Mar. 30, 2012 | (EP) | 12002342 |
| May 10, 2012 | (EP) | 12003718 |

(51) Int. Cl.
*C04B 7/32* (2006.01)
*C04B 7/345* (2006.01)
*C04B 28/04* (2006.01)
*C04B 28/06* (2006.01)
*C04B 28/08* (2006.01)
*C04B 40/00* (2006.01)
*C04B 28/02* (2006.01)
*C04B 22/00* (2006.01)
*C04B 22/14* (2006.01)
*C04B 7/02* (2006.01)
*C04B 7/26* (2006.01)
*C04B 7/28* (2006.01)
*C04B 16/04* (2006.01)
*C04B 103/14* (2006.01)
*C04B 111/00* (2006.01)

(52) U.S. Cl.
CPC ............. *C04B 7/3453* (2013.01); *C04B 28/04* (2013.01); *C04B 28/065* (2013.01); *C04B 28/08* (2013.01); *C04B 7/323* (2013.01); *C04B 7/326* (2013.01); *C04B 7/345* (2013.01); *C04B 40/0039* (2013.01); *C04B 2103/14* (2013.01); *C04B 2111/00017* (2013.01); *C04B 2111/00767* (2013.01); *C04B 28/02* (2013.01); *C04B 22/0093* (2013.01); *C04B 22/14* (2013.01); *C04B 7/02* (2013.01); *C04B 7/26* (2013.01); *C04B 7/28* (2013.01); *C04B 16/04* (2013.01); *C04B 28/021* (2013.01)

(58) Field of Classification Search
CPC .......... C04B 7/32; C04B 7/323; C04B 7/345; C04B 7/3453; C04B 28/04; C04B 28/065; C04B 28/08; C04B 40/0039
USPC ......... 106/638, 692, 693, 695, 739, 763, 765, 106/767
See application file for complete search history.

(56) References Cited

U.S. PATENT DOCUMENTS

| | | | |
|---|---|---|---|
| 6,113,684 A * | 9/2000 | Kunbargi | ............... 106/692 |
| 6,406,534 B1 | 6/2002 | Kunbargi | |
| 6,758,896 B2 | 7/2004 | Kunbargi | |
| 7,150,786 B2 | 12/2006 | Kunbargi | |
| 8,153,552 B2 | 4/2012 | Cau Dit Coumes et al. | |
| 8,557,039 B2 | 10/2013 | Jacob et al. | |
| 8,574,359 B2 | 11/2013 | Marchi et al. | |
| 2002/0164485 A1 | 11/2002 | Martin | |
| 2004/0101672 A1 | 5/2004 | Anton et al. | |

(Continued)

FOREIGN PATENT DOCUMENTS

| | | |
|---|---|---|
| AT | 393 381 B | 10/1991 |
| CN | 1479700 A | 3/2004 |

(Continued)

OTHER PUBLICATIONS

Belz et al., "Use of Fly Ash, Blast Furnace Slag, and Chemical Gysum for the Synthesis of Calcium Sulfoaluminate-Based Cements", Fly Ash, Silica Fume, Slag and Natural Pozzolans in Concrete. Proceedings International Conference, vol. 1, No. SP-153 (1995), pp. 513-530, XP001011491.
Beretka et al,. "The Influence of $C_4A_3S$ Content and W/S Ratio on the Performance of Calcium Sulfoaluminate-based Cements", Cement and Concrete Research, vol. 26, No. 11 (1996), pp. 1673-1681.
European Search Report, Appl. No. 11006757.6, Jan. 25, 2012, 9 pgs.
European Search Report, Appl. No. 12001488.1, Jun. 27, 2012, 13 pgs.

(Continued)

*Primary Examiner* — Anthony J Green
(74) *Attorney, Agent, or Firm* — Paul D. Strain, Esq.; Strain & Strain PLLC

(57) ABSTRACT

The present invention relates to the production of a ternesite-belite-calcium sulfoaluminate (ferrite) clinker. The invention also relates to the use of alternative raw materials for clinker production, for example raw materials based on industrial byproducts, including those of low quality, such as lump slag and ash having a low glass content and/or a high free lime content and/or a high content of crystalline high-temperature phases, as well as naturally occurring rocks and rock glasses of comparative chemical composition.

29 Claims, 12 Drawing Sheets

(56) References Cited

U.S. PATENT DOCUMENTS

| | | |
|---|---|---|
| 2011/0308431 A1 | 12/2011 | Pasquier et al. |
| 2012/0085265 A1 | 4/2012 | Walenta et al. |
| 2013/0118384 A1 | 5/2013 | Barnes-Davin et al. |
| 2014/0230696 A1 | 8/2014 | Bullerjahn et al. |
| 2014/0230697 A1 | 8/2014 | Bullerjahn et al. |
| 2014/0230699 A1 | 8/2014 | Bullerjahn et al. |
| 2014/0238274 A1 | 8/2014 | Bullerjahn et al. |
| 2014/0261088 A1 | 9/2014 | Bullerjhan et al. |

FOREIGN PATENT DOCUMENTS

| | | |
|---|---|---|
| CN | 101952216 A | 1/2011 |
| DE | 21 22 710 A1 | 11/1971 |
| DE | 37 01 717 C1 | 4/1988 |
| DE | 196 44 654 A1 | 4/1998 |
| DE | 198 43 092 A1 | 11/1999 |
| DE | 600 29 770 T2 | 8/2007 |
| DE | 10 2005 054 190 B3 | 10/2007 |
| EP | 0 397 963 A1 | 11/1990 |
| EP | 0 838 443 A1 | 4/1998 |
| EP | 0 858 981 A1 | 8/1998 |
| EP | 0 959 053 A1 | 11/1999 |
| EP | 1 171 398 B1 | 8/2006 |
| EP | 2 159 202 A1 | 3/2010 |
| EP | 2 559 674 A1 | 2/2013 |
| FR | 2 901 270 A1 | 11/2007 |
| FR | 2 928 643 A1 | 9/2009 |
| FR | 2 946 978 A1 | 12/2010 |
| JP | 9-268037 A | 10/1997 |
| JP | 2001-130945 A | 5/2001 |
| WO | WO 98/18740 A1 | 5/1998 |
| WO | WO 2005/097700 A2 | 10/2005 |
| WO | WO 2012/055517 A1 | 5/2012 |
| WO | WO 2013/023727 A2 | 2/2013 |
| WO | WO 2013/023728 A2 | 2/2013 |
| WO | WO 2013/023729 A2 | 2/2013 |
| WO | WO 2013/023730 A2 | 2/2013 |
| WO | WO 2013/023732 A2 | 2/2013 |

OTHER PUBLICATIONS

European Search Report, Appl. No. 12002111.8, Jun. 27, 2012, 15 pgs.
European Search Report, Appl. No. 12002342.9, Jul. 25, 2012, 13 pgs.
European Search Report, Appl. No. 12003718.9, Oct. 11, 2012, 14 pgs.
International Search Report, PCT/EP2012/002974, Feb. 8, 2013, 3 pgs.
International Search Report, PCT/EP2012/002975, Feb. 8, 2013, 4 pgs.
International Search Report, PCT/EP2012/002976, Feb. 8, 2013, 4 pgs.
International Search Report, PCT/EP2012/002977, Feb. 8, 2013, 3 pgs.
International Search Report, PCT/EP2012/002978, Feb. 8, 2013, 2 pgs.
International Search Report, PCT/EP2012/002979, Feb. 8, 2013, 4 pgs.
Irran et al., "Ternesit, $Ca_5(SiO_4)_2SO_4$, a new Mineral from the Ettringer Bellerberg/Eifel, Germany", Mineralogy and Petrology, vol. 60, No. 1-2 (1997), pp. 121-132.
Kurdowski et al., "Mineral Composition of Build-Up in Cement KILN Preheater", Journal of Thermal Analysis and Calorimetry, vol. 55 (1999), pp. 1021-1029.
Marroccoli et al., "Synthesis of Calcium Sulfoaluminate Cements From $Al_2O_3$-Rich By-products From Aluminium Manufacture", $2^{nd}$ International Conference on Sustainable Construction Materials and Technologies Jun. 28-30, 2010, University Politecnica Delle Marche, Ancona, Italy, No. 2 (2010), pp. 1-9, XP002645670.
Sherman et al., "Long-term behaviour of hydraulic binders based on calcium sulfoaluminate and calcium sulfosilicate", Cement & Concrete Research, vol. 25, No. 1 (1995), pp. 113-126.
Stark, "Zement und Kalk: Der Baustoff als Werkstoff", Jan. 1, 2000. Birkhauser. Basel, XP002679558, ISBN: 3-7643-6216-2, p. 61.
Belz et al., "Synthesis of Special Cements from Mixtures Containing Fluidized Bed Combustion Waste, Calcium Carbonate and Various Sources of Alumina", 28th Meeting of the Italian Section of the Combustion Institute (2005), pp. I-4-1-I-4-6.
Belz et al., "Fluidized Bed Combustion Waste as a Raw Mix Component for the Manufacture of Calcium Sulphoaluminate Cements", 29th Meeting of the Italian Section of the Combustion Institute (2006), pp. IX4.1-IX4.5.
English translation of International Preliminary Report on Patentability, PCT/EP2012/002974, Feb. 20, 2014.
English translation of International Preliminary Report on Patentability, PCT/EP2012/002975, Feb. 20, 2014.
English translation of International Preliminary Report on Patentability, PCT/EP2012/002976, Feb. 20, 2014.
English translation of International Preliminary Report on Patentability, PCT/EP2012/002977, Feb. 27, 2014.
English translation of International Preliminary Report on Patentability, PCT/EP2012/002978, Feb. 20, 2014.
English translation of International Preliminary Report on Patentability, PCT/EP2012/002979, Feb. 27, 2014.
Jewell et al., "The Fabrication of Value Added Cement Products from Circulating Fluidized Bed Combustion Ash", 2007 World of Coal Ash (WOCA), May 7-10, 2007, Northern Kentucky, USA, 11 pgs.
Kapralik et al., "Phase Changes in the System $CaO-Al2O3-SiO2-Fe2O3-MgO-CaSO4-K2SO4$ in Ar up to 1300° C. referred to Sulphoaluminate Cement Clinker", Br. Ceram. Trans. J., vol. 85 (1986), pp. 131-136.
Sahu et al., "Phase compatibility in the system $CaO-SiO2-Al2O3-Fe2O3-SO3$ referred to sulphoaluminate belite cement clinker", Cement and Concrete Research, vol. 23 (1993), pp. 1331-1339.
Bullerjahn, U.S. PTO Office Action, U.S. Appl. No. 14/239,319, Jun. 26, 2014, 18 pgs.
Bullerjahn, U.S. PTO Office Action, U.S. Appl. No. 14/239,339, Jun. 27, 2014, 16 pgs.
Bullerjahn, U.S. PTO Office Action, U.S. Appl. No. 14/239,348, Jun. 30, 2014, 15 pgs.
Beretka et al. "Synthesis and Properties of Low Energy Cements based on C4A3S", 9th International Congress on the Chemistry of Cement (1992), pp. 195-200.
Beretka et al., "Utilisation of industrial wastes and by-products for the synthesis of special cements", Resources, Conservation and Recycling, vol. 9 (1993), pp. 179-190.
Calos et al., Structure of Calcium Aluminate Sulfate $Ca4Al6O16S$, Journal of Solid State Chemistry, vol. 119 (1995), pp. 1-7.
Schmidt et al. "Quantification of Calcium Sulpho-Aluminate Cement by Rietveld Analysis", Materials Science Forum, vols. 321-324 (2000), pp. 1022-1027.
Bullerjahn, U.S. PTO Notice of Allowance, U.S. Appl. No. 14/239,319, filed Dec. 29, 2014, 13 pgs.
Bullerjahn, U.S. PTO Notice of Allowance, U.S. Appl. No. 14/239,339, filed Jan. 12, 2015, 13 pgs.
Bullerjahn, U.S. PTO Notice of Allowance, U.S. Appl. No. 14/239,348, filed Jan. 5, 2015, 11 pgs.
Japanese Office Action, Application No. 2014-525336, Mar. 3, 2015, 4 pgs.
Odler, Special Inorganic Cements:, (2000), pp. 65, 66, 78, ISBN: 0-419-22790-3, http://books.google.co.jp/books?id=p6YTKgk8mBgC&pg=PA66&dg=C4A3&f=false.
Makhmudova et al., "Synthesis and Properties of Sulphoferrite Calcium Clinkers and Low Temperature Cements on their Basis", Journal of the University of Chemical Technology and Metallurgy, vol. 46, No. 2 (2011), pp. 151-154.
"CaO-Al2O3-SO3-SiO2", P051045:10946, Mar. 11, 2015, pp. 95-98.
Li et al., "Microwave sintering of sulphoaluminate cement with utility wastes", Cement and Concrete Research, vol. 31, No. 9 (2001), pp. 1257-1261.
Chinese Search Report and English translation thereof, Appl. No. 201280040006.0, Apr. 28, 2015, 4 pgs.

(56) References Cited

OTHER PUBLICATIONS

Chinese Office Action and English translation thereof, Appl. No. 201280040099.7, Feb. 13, 2015, 21 pgs.

Bullerjahn, U.S. PTO Office Action, U.S. Appl. No. 14/238,976, filed Apr. 16, 2015, 22 pgs.

Chinese Office Action and English translation thereof, Appl. No. 201280040095.9, Mar. 19, 2015, 16 pgs.

Bullerjahn, U.S. PTO Office Action, U.S. Appl. No. 14/238,947, filed Mar. 25, 2015, 21 pgs.

Bullerjahn, U.S. PTO Notice of Allowance, U.S. Appl. No. 14/239,319, filed May. 8, 2015, 11 pgs.

Bullerjahn, U.S. PTO Notice of Allowance, U.S. Appl. No. 14/239,339, filed May 8, 2015, 12 pgs.

Bullerjahn, U.S. PTO Notice of Allowance, U.S. Appl. No. 14/239,348, filed May 12, 2015, 11 pgs.

* cited by examiner

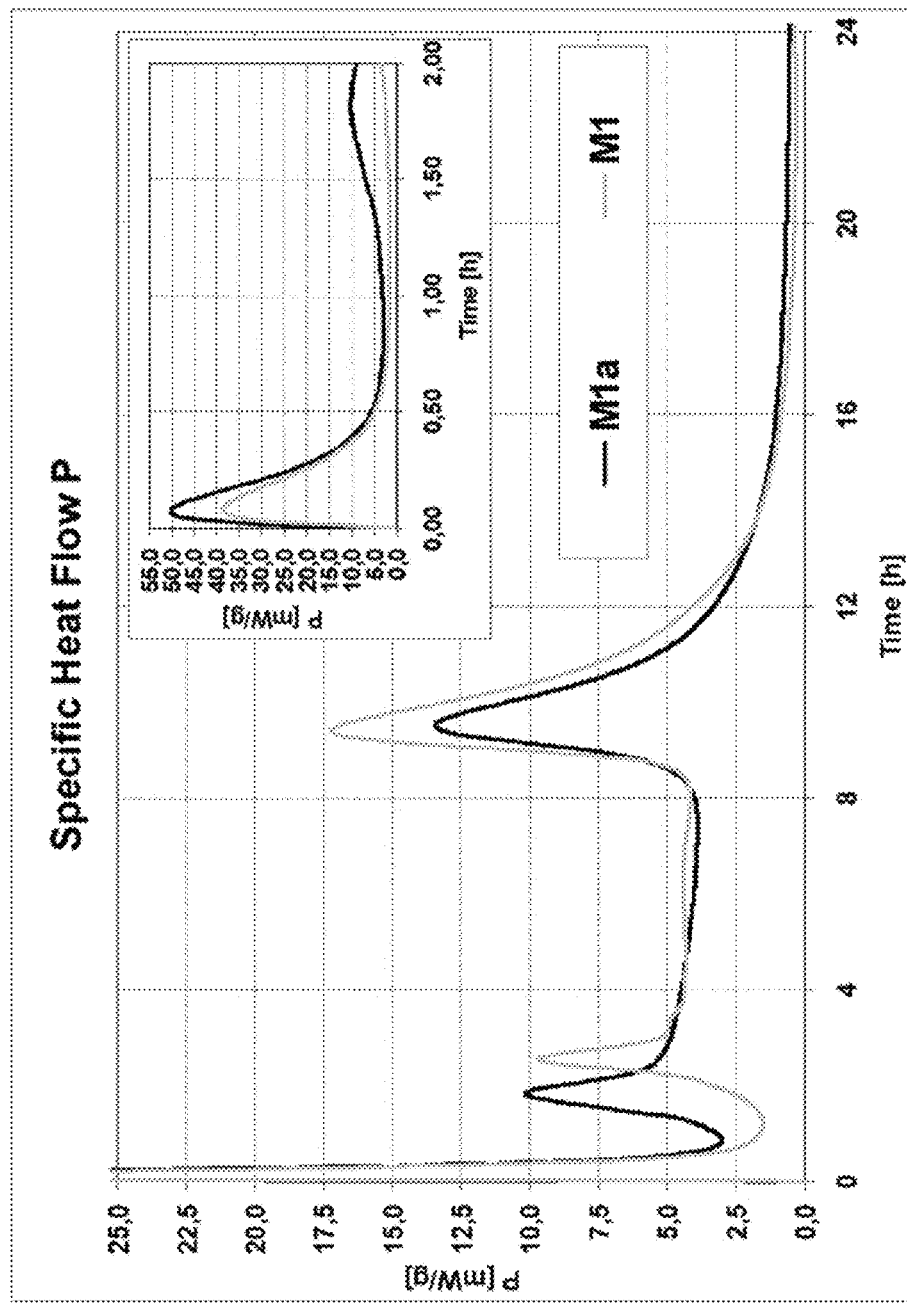
Figure 1a: Heat flow of the hardened cement pastes M1 and M1a

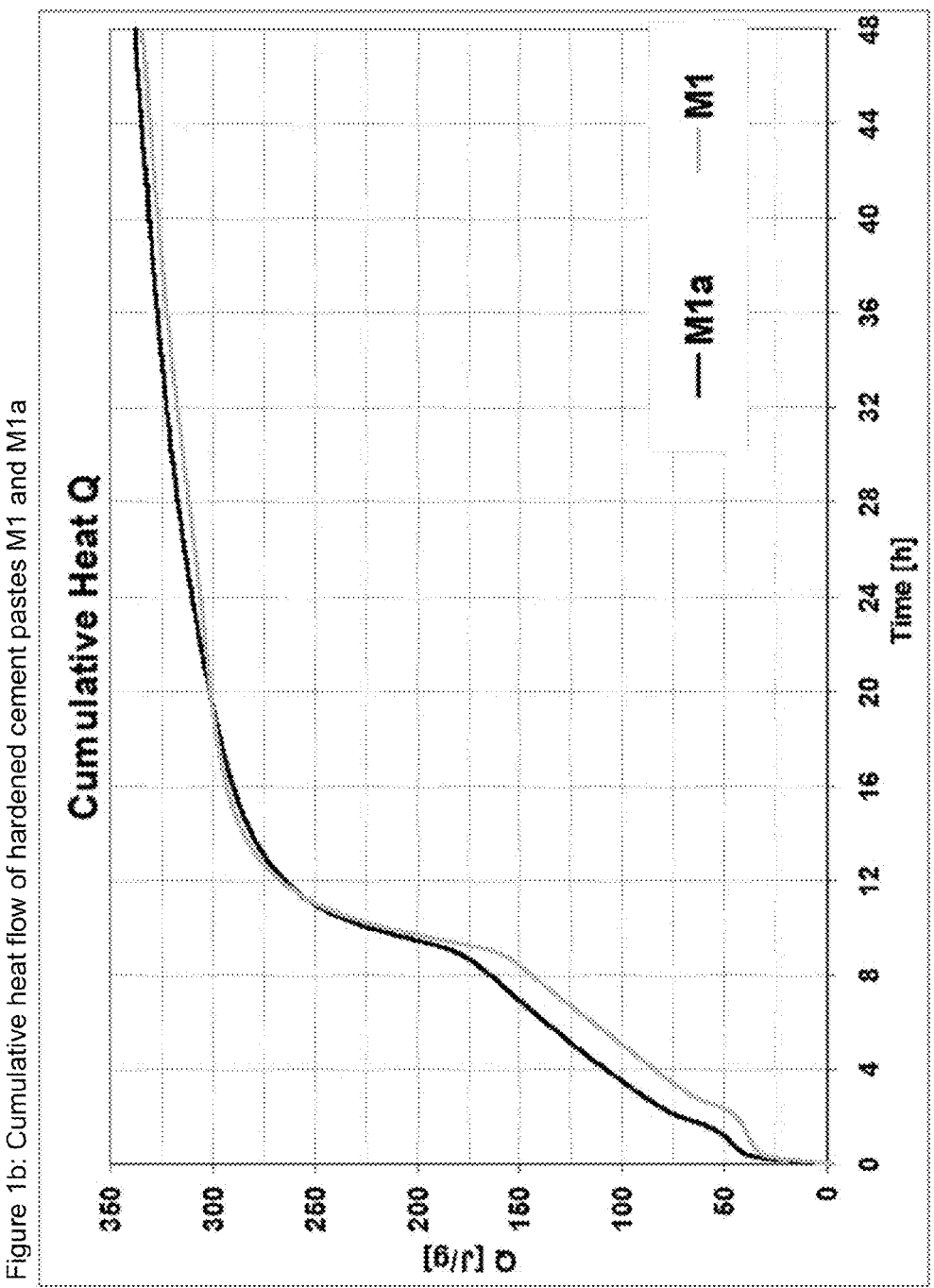
Figure 1b: Cumulative heat flow of hardened cement pastes M1 and M1a

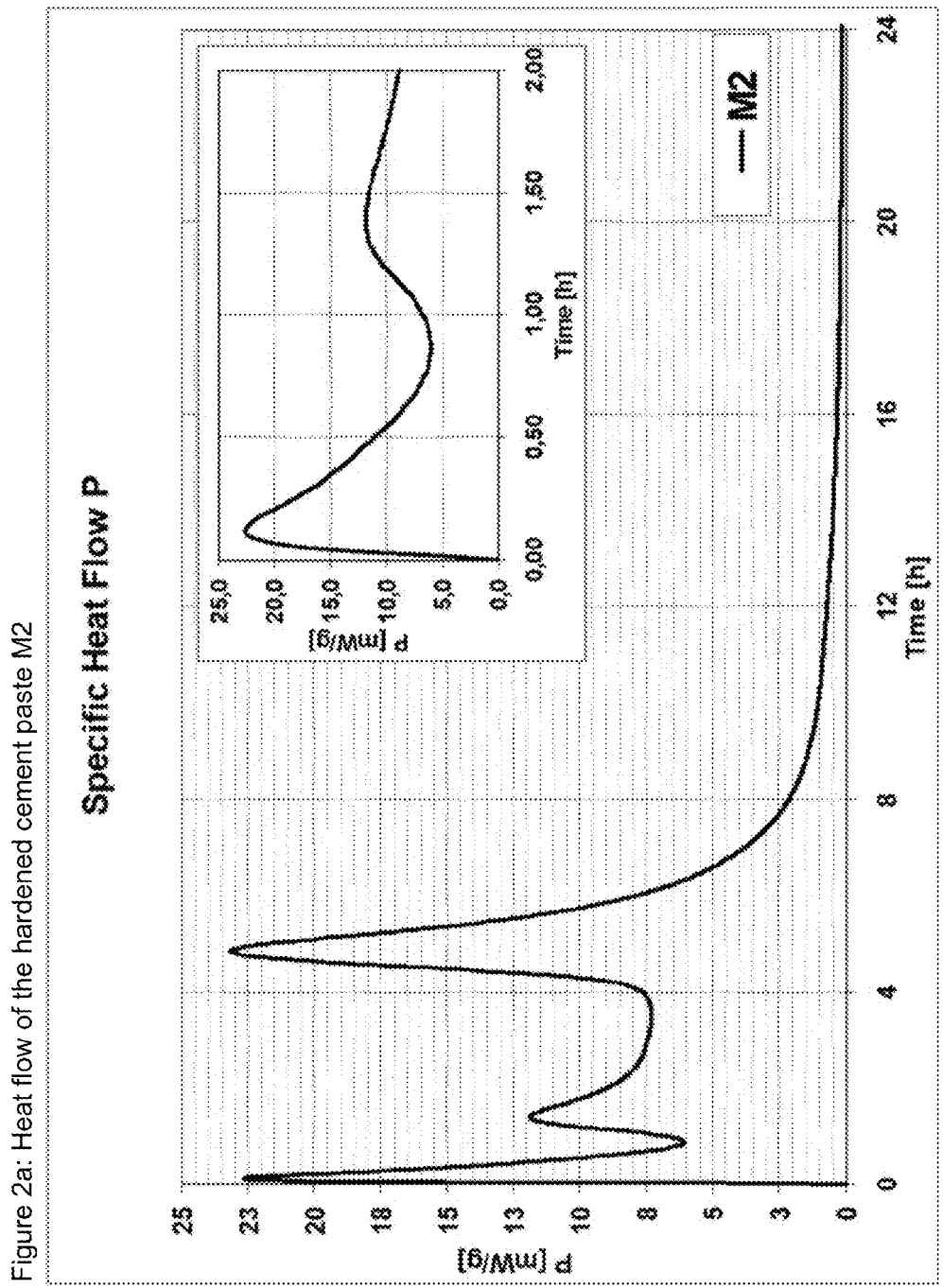
Figure 2a: Heat flow of the hardened cement paste M2

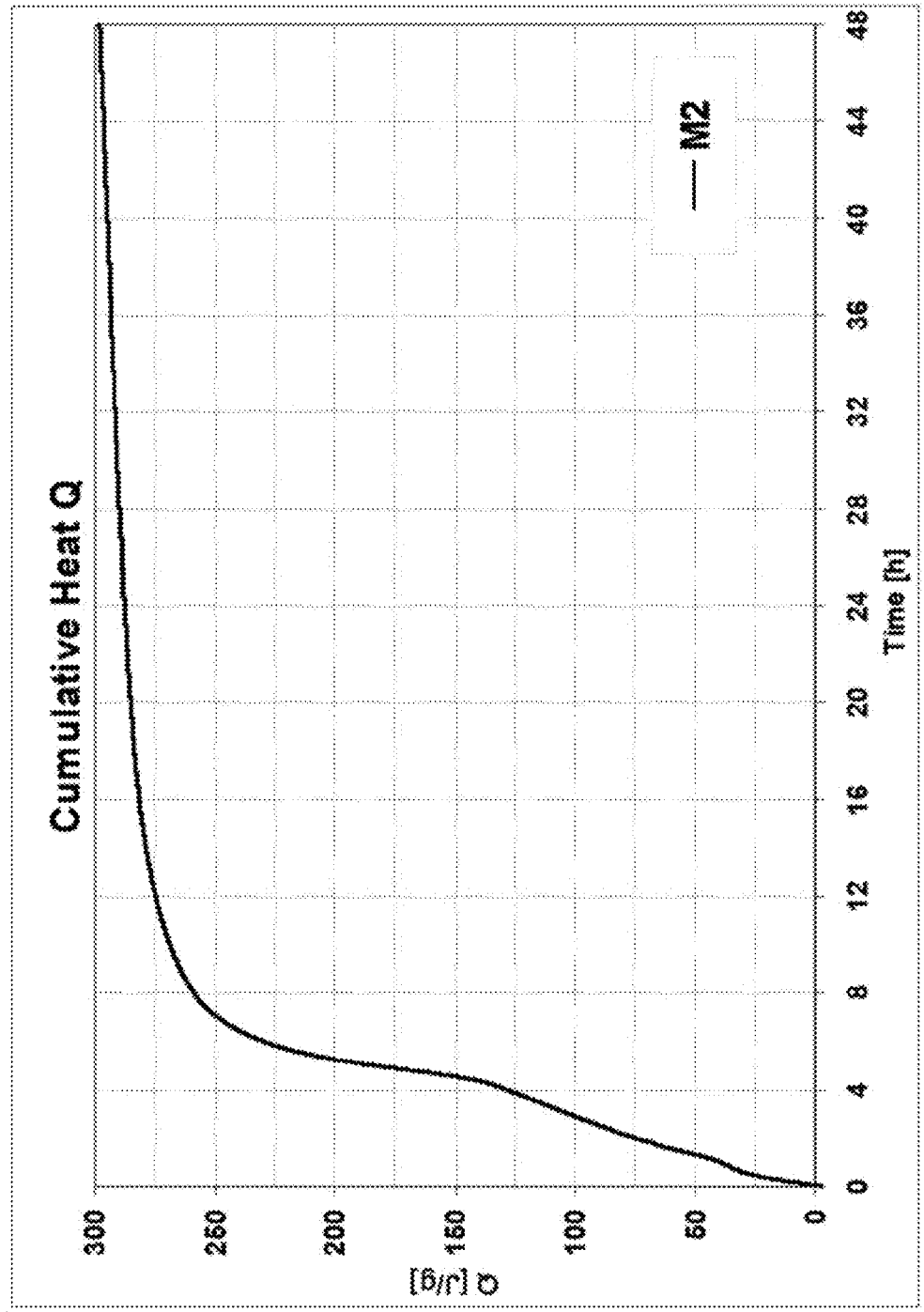
Figure 2b: Cumulative heat flow of the hardened cement paste M2

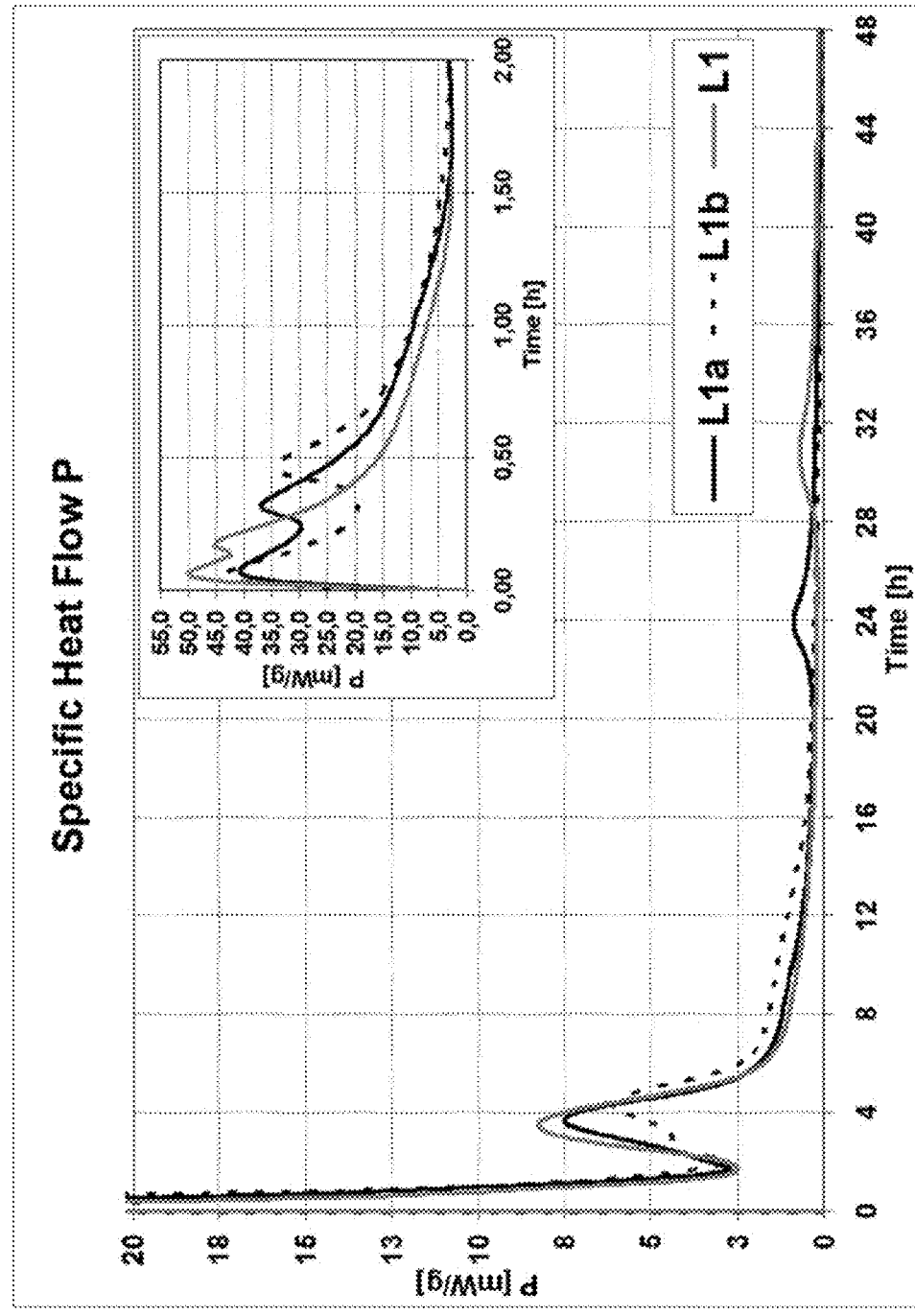
Figure 3a: Heat flow of the hardened cement pastes L1, L1a, L1b

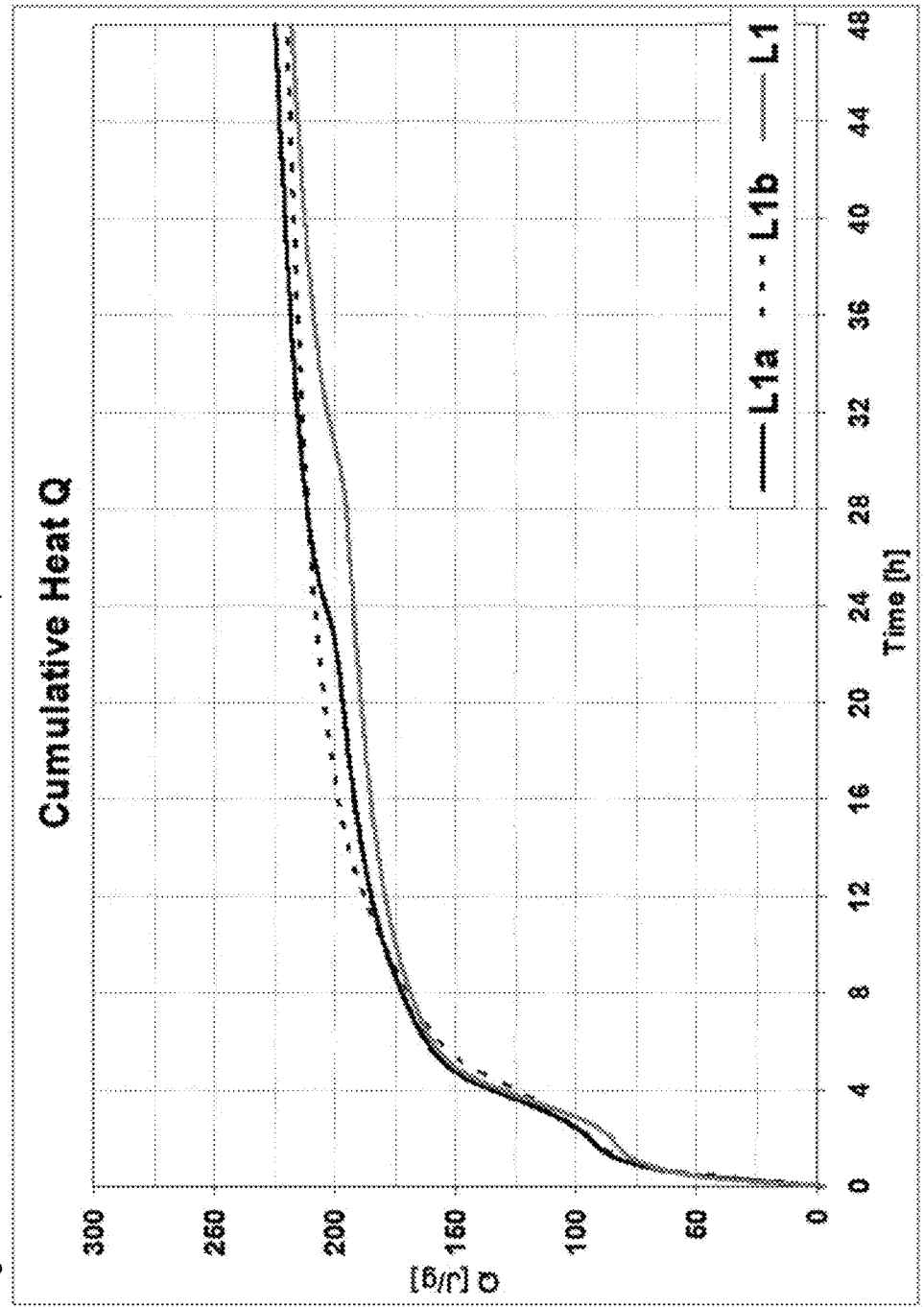
Figure 3b: Cumulative heat flow of the hardened cement pastes L1, L1a, L1b

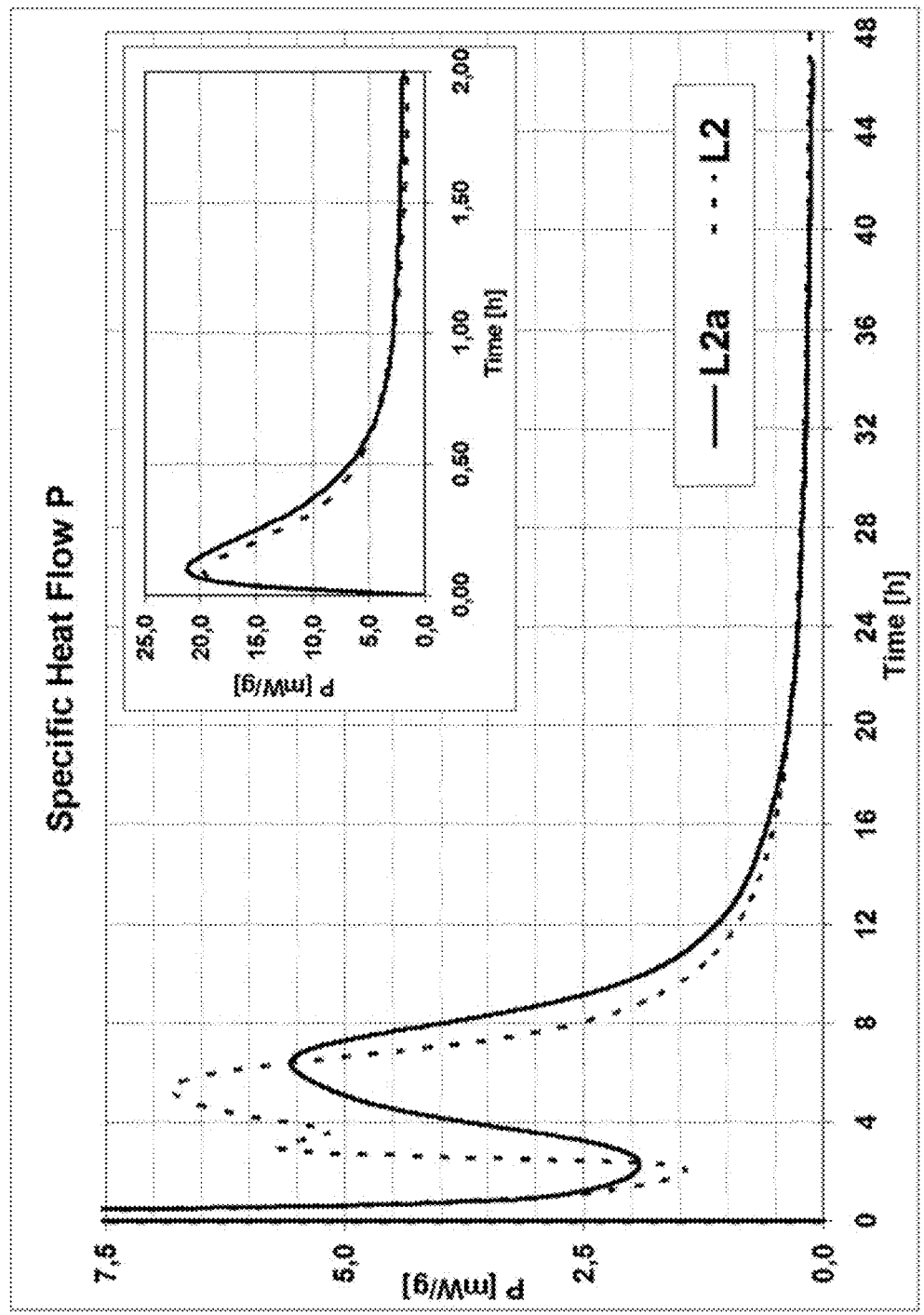
Figure 4a: Heat flow of the hardened cement pastes L2 and L2a

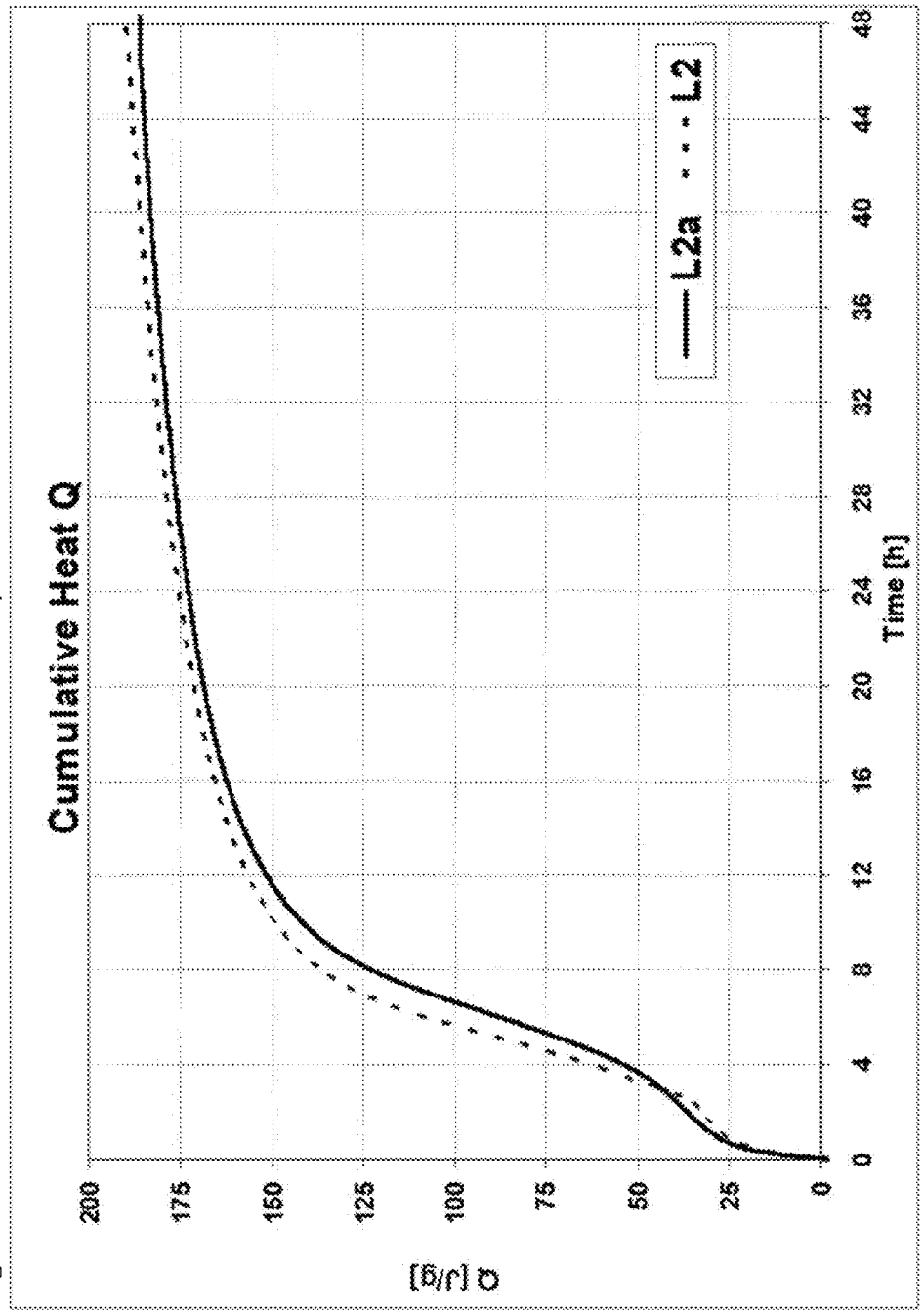
Figure 4b: Cumulative heat flow of the hardened cement pastes L2 and L2a

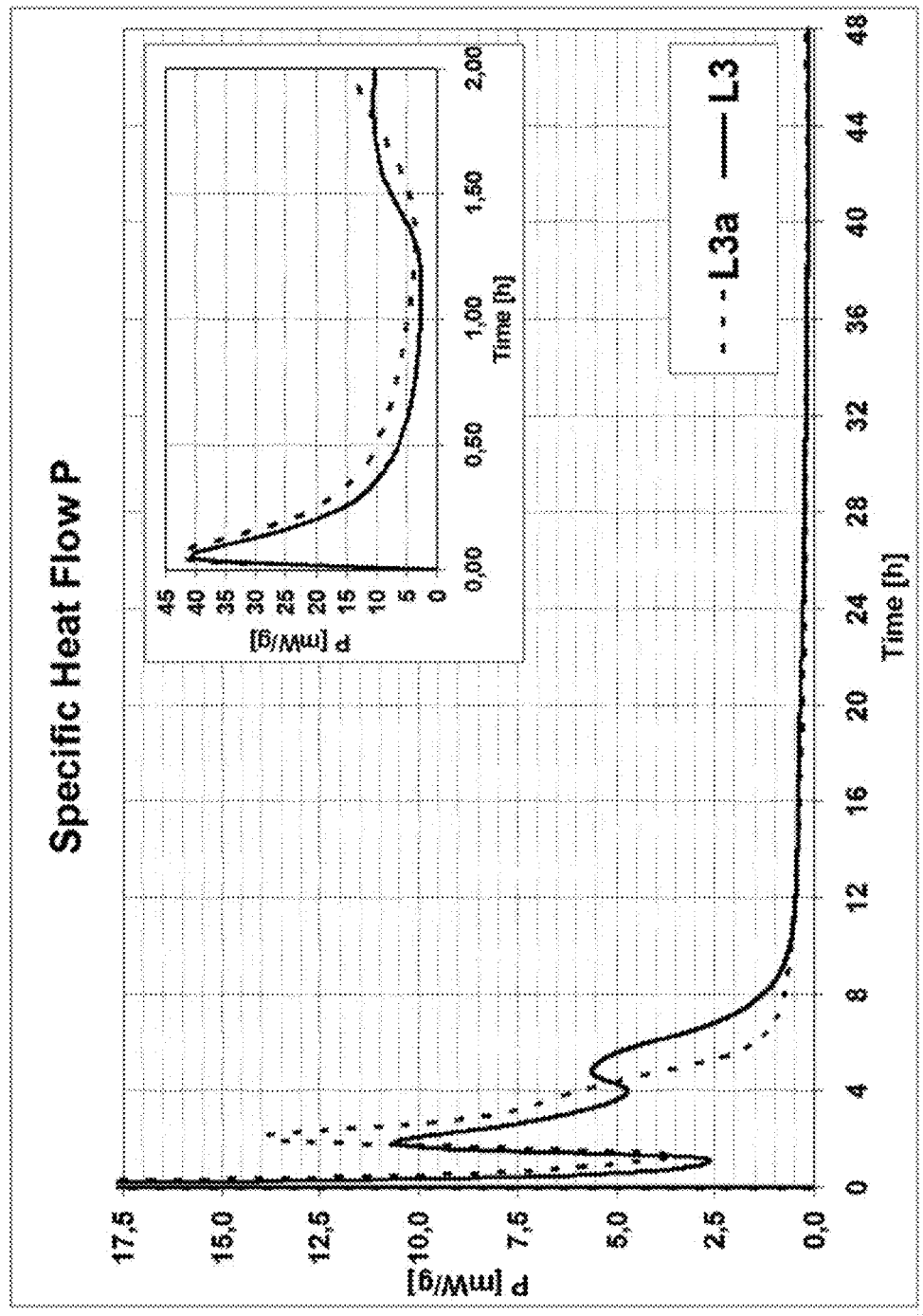
Figure 5a: Heat flow of the hardened cement pastes L3 and L3a

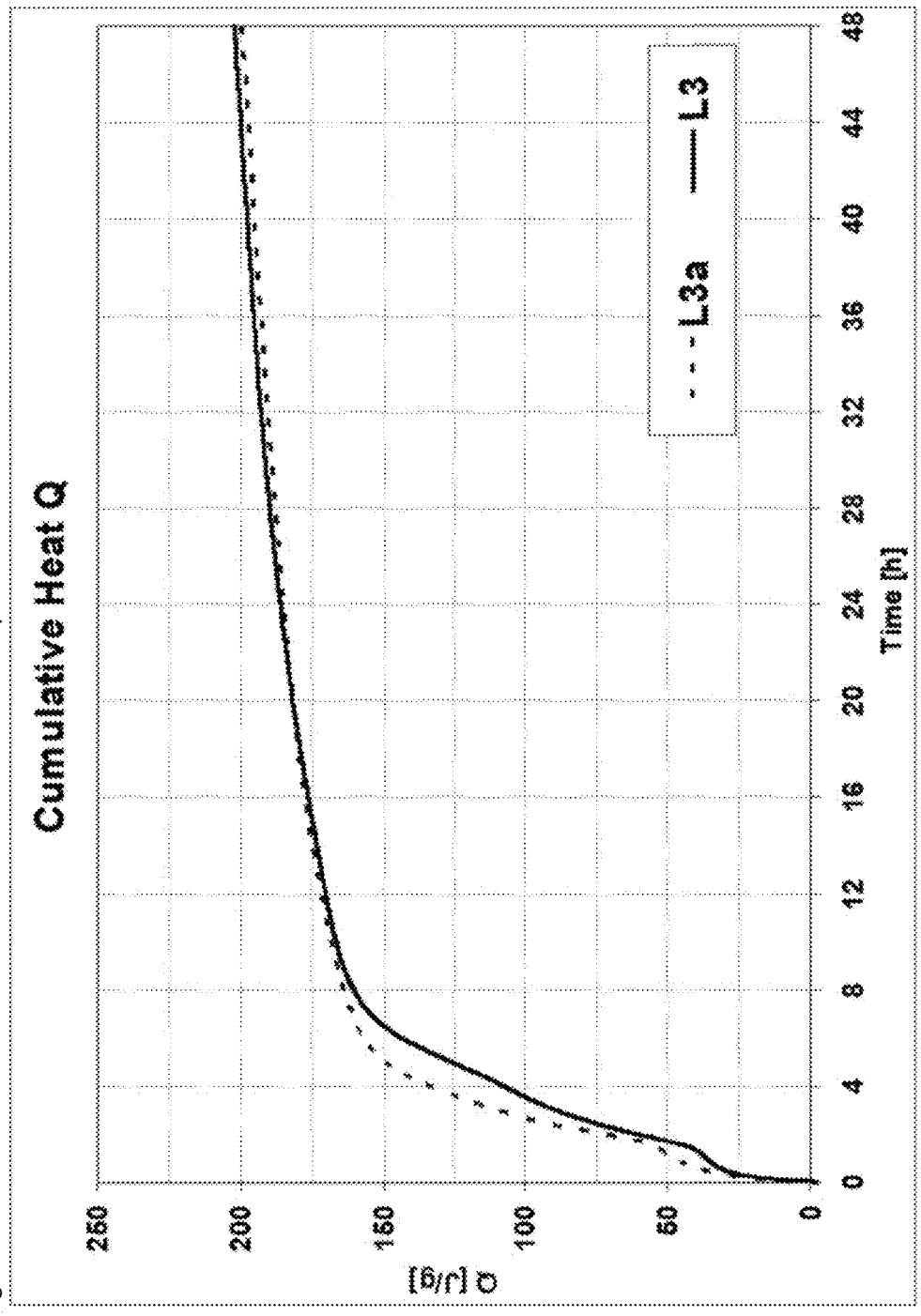
Figure 5b: Cumulative heat flow of the hardened cement pastes L3 and L3a

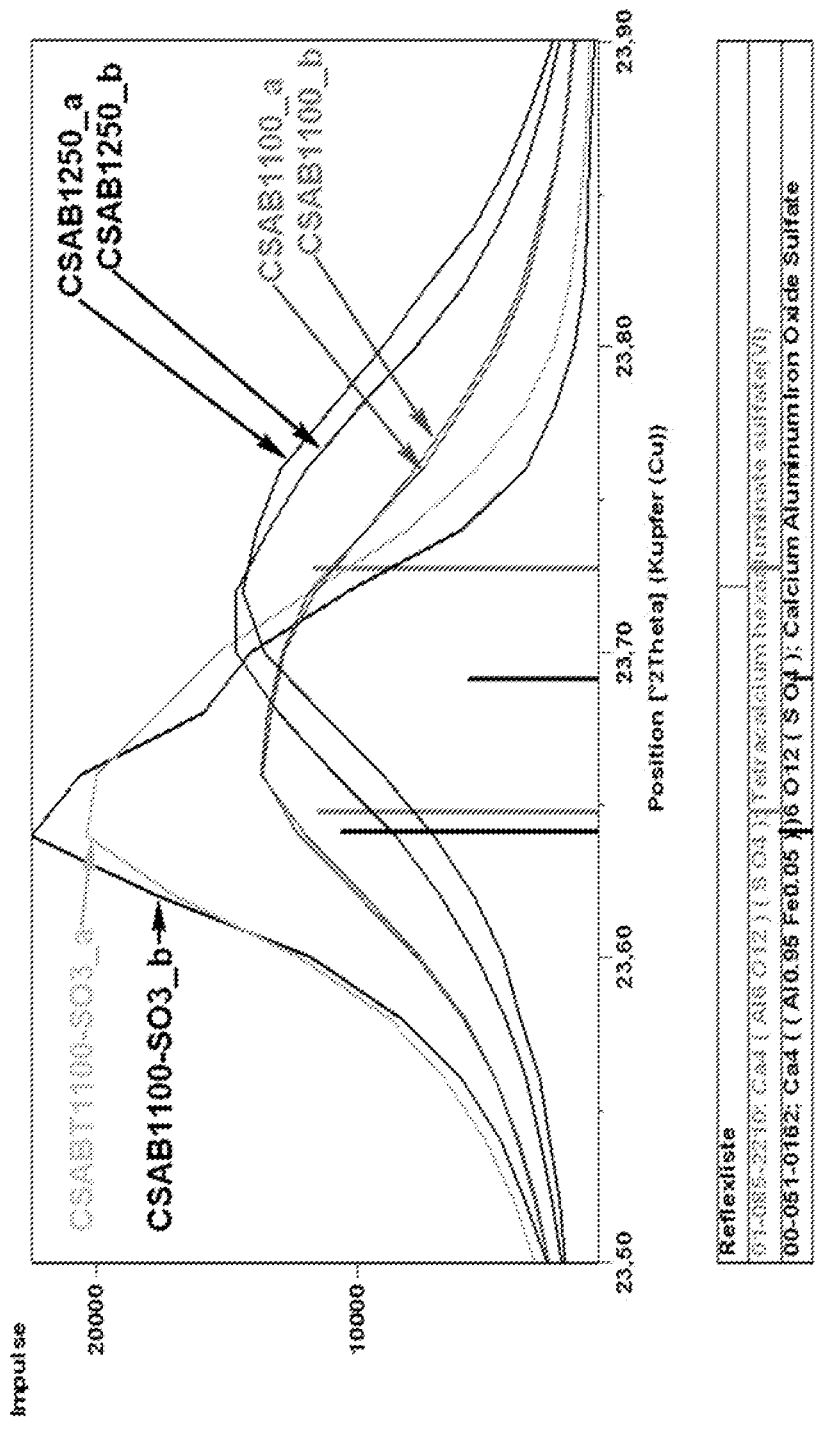
Figure 6: Peak layer shift depending on synthesis temperature and the specific cooling program and SO₃ content

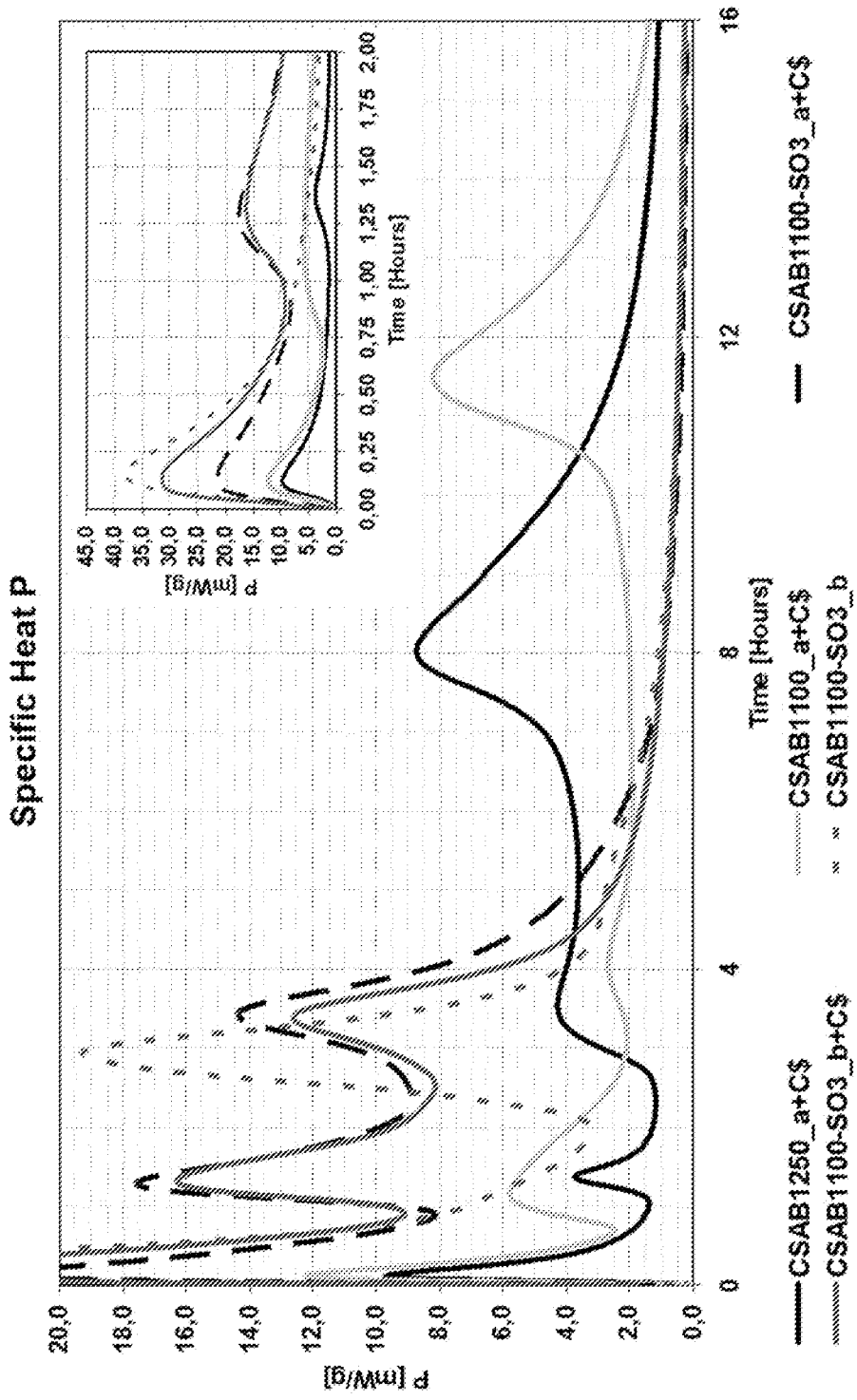
Figure 7: Heat flow of the hardened cement pastes produced from mixtures of the clinkers according to example 6

METHOD FOR PRODUCING TERNESITE-BELITE CALCIUM SULFOALUMINATE CLINKER

CROSS-REFERENCE TO RELATED PATENT APPLICATIONS

This application is a National Stage of International Application No. PCT/EP2012/002978, filed Jul. 16, 2012, which is based upon and claims the benefit of priority from prior European Patent Applications No. 11006757.6, filed Aug. 18, 2011, Ser. No. 11/008,570.1, filed Oct. 26, 2011, Ser. No. 12/001,488.1, filed Mar. 5, 2012, Ser. No. 12/002,111.8, filed Mar. 26, 2012, Ser. No. 12/002,342.9, filed Mar. 30, 2012, and No. 12003718.9, filed May 10, 2012, the entire contents of all of which are incorporated herein by reference in their entirety.

The present invention relates to the production of a ternesite-belite-calcium sulfoaluminate (ferrite) clinker (TBC$A (F)). The invention further relates to the use of alternative raw materials for clinker production, for example raw materials based on industrial byproducts, including those of low quality, such as lump slag and ash having a low glass content and/or a high free lime content and/or a high content of crystalline high-temperature phases, as well as naturally occurring rocks and rock glasses of comparative chemical composition.

The cement industry accounts for a considerable proportion of the global production of $CO_2$. Over the last few years, the worldwide growing demand for cement, notably in developing countries, as well as rising costs for raw materials, energy and $CO_2$ certificates have resulted in an increasing reduction of the clinker factor, for example by adding limestone powders, fly ash and granulated blast furnace slag as clinker replacement materials. This use of byproducts and waste products from other industries as well as the development of alternative binders are increasingly becoming the focus of attention in politics, science and business.

Around the world, enormous amounts of materials are incurred as part of thermal waste disposal/energy generation, steel production, noble metal extraction, etc., which hereinafter will be referred to as industrial byproducts. Depending on the quality/composition/field of application, some or all of these can be reused in various processes and products, for example as correcting agents for clinker production for Portland cement, as additives for concrete, and as aggregates for asphalt and concrete, etc.

However, due to various factors, for example the lack of uniformity (chemism and mineralogy) and the content of harmful substances (organic chemistry, heavy metals, etc.), the use of industrial byproducts entails some problems. Among other things, a decreasing reactivity/quality of OPC clinkers or insufficient volume stability of cements can cause large quantities of such materials to be disposed of at great expense every year or used as waste dump materials and landfill materials. Difficulties can also occur with the disposal of such materials, for example leaching processes may contaminate surrounding areas and water systems/groundwater.

The use/treatment of industrial byproducts thus constitutes a major challenge and a problem that has yet to be resolved. In the future, the most efficient and sustainable use of resources will be indispensable and have relevance around the world.

Besides the substitution of clinker in cement and of raw materials in the raw meal mixture, attempts have also been made to find other hydraulically hardening binders. These include sulfoaluminate cements and cements containing belite as a main component.

To simplify the description below, the following abbreviations, which are common in the cement industry, will be used: H—$H_2O$, C—CaO, A—$Al_2O_3$, F—$Fe_2O_3$, M—MgO, S—$SiO_2$ and \$-$SO_3$.

So as to simplify the further description, compounds are generally indicated in the pure forms thereof, without explicitly stating series of solid solutions/substitution by foreign ions and the like, as are customary in technical and industrial materials. As any person skilled in the art will understand, the composition of the phases mentioned by name in the present invention may vary, depending on the chemism of the raw meal and the type of production, due to the substitution with various foreign ions, such compounds likewise being covered by the scope of the present invention.

PRIOR ART

On an industrial scale, calcium sulfoaluminate cement is normally produced by the sintering of homogenized, fine-particulate, natural raw materials, such as limestone, bauxite, gypsum/hemihydrate/anhydrite, aluminum-rich clay and an $SiO_2$ source, in a rotary kiln between 1100° C. and 1350° C. and has a significantly different chemism and phase content compared to Portland cement. Table 1 compares the phases present in Portland cement (OPC) and sulfoaluminate cement (BC$AF). Different industrial byproducts, such as granulated blast furnace slag and fly ash, can also be added to the raw meal for sulfoaluminate cement.

A key, hydraulically active component of calcium sulfoaluminate cement is a (solid solution) crystal of the compounds of following composition $3CaO.3Al_2O_3.CaSO_4.3CaO.3Fe_2O_3.CaSO_4$ ($C_4A_3\$-C_4F_3\$$; sulfoaluminate-sulfoferrite, ye'elimite), which, once mixed with water and in the presence of soluble sulfates and additional calcium carriers, reacts to form ettringite, $3CaO.(Al_2O_3/Fe_2O_3).3CaSO_4.32H_2O$, as well as different monophases. The (hydrate) phases formed (for example ettringite [$AF_t$], monophases [$AF_m$], etc.) can bind and permanently fix a large number of different (harmful) substances, for example by the incorporation into the crystal structure of the hydrate phase, agglomeration at particle surfaces, fixing in the cement lime, precipitation, for example as hydroxides/carbonates, and the like. Two further hydraulically active phases of the calcium sulfoaluminate cement are dicalcium silicate ($C_2S$) and tetracalcium-aluminate ferrite ($C_4AF$), which primarily contribute to final strength, however.

TABLE 1

Chemism and Mineralogy of OPC Compared to BC$AF

| | Temperature [° C.] | Chem. Composition [%] | Miner. Composition [%] |
|---|---|---|---|
| OPC | ~1450 | CaO [55-75] | $C_3S$ [50-70] |
| | | $SiO_2$ [15-25] | $C_2S$ [10-40] |
| | | $Al_2O_3$ [2-6] | $C_3A$ [0-15] |
| | | $Fe_2O_3$ [0-6] | $C_4AF$ [0-20] |
| | | $SO_3$ [1.5-4.5] | C$ [2-10] |
| | | | C [0-3] |
| | | | Cc [0-5] |
| BCSAF | ~1250 | CaO [40-70] | $C_2S$ [2-70] |
| | | $SiO_2$ [2-40] | $C_4A_3\$$ [10-75] |
| | | $Al_2O_3$ [5-40] | $C_4AF$ [0-30] |
| | | $Fe_2O_3$ [0-15] | C$ [5-30] |
| | | $SO_3$ [5-25] | Secondary phases |

EP 0 838 443 A1 describes the production of calcium sulfoaluminate cement on the basis of aluminum-containing residual materials.

DE 196 44 654 A1 describes the production of a calcium sulfoaluminate cement from treated salt slags.

FR 2 928 643 describes the production and composition of a belite-calcium sulfoaluminate (ferrite) clinker from a mixture comprising minerals which contain calcium, aluminum, silicon, iron and sulfur, preferably in the form of sulfate. The raw meal mixture is sintered by being passed through a kiln with a pass-through time of at least 15 minutes.

FR 2 946 978 describes the production and composition of a belite-calcium sulfoaluminate (ferrite) clinker from a mixture of different raw materials.

EP 1 171 398 B1 (DE 600 29 779 T2) describes the low-temperature sintering of specific mixtures of raw materials so as to produce special clinkers in the kiln which have high concentrations of crystal $X=\{(C, K, N, M)_4(A, F, Mn, P, T, S)_3(Cl, \$)\}$ and crystal $Y=C_9S_3\$Ca(f,cl)_2$ and/or crystal $Z=\{C_5S_2\$\}$. These clinkers are mixed with hydraulic cement or cement of the Portland type to produce finished cement compositions.

It was the object of the invention to provide a method for producing hydraulically reactive clinker, which has a lesser negative impact on the environment, by enabling industrial byproducts to constitute a large portion of the raw meal mixture and/or the production process releases less $CO_2$.

Surprisingly, it was found that the $C_5S_2\$$ phase (ternesite, also referred to as sulfospurrite) constitutes a significantly reactive component in specific sulfoaluminate cements. The literature (see, for example, "Synthesis of Calcium Sulfoaluminate Cements From $Al_2O_3$-Rich By-products from Aluminum Manufacture", Milena Marroccoli et al., The second international conference on sustainable construction materials and technologies 2010, "Synthesis of Special Cements from Mixtures Containing Fluidized Bed Combustion Waste, Calcium Carbonate and Various Sources of Alumina", Belz et al, 28th Meeting of the Italian Section of The Combustion Institute 2005, "Fluidized Bed Combustion Waste as a Raw Mix Component for the Manufacture of Calcium Sulphoaluminate Cements", Belz G et al, 29th Meeting of the Italian Section of The Combustion Institute, 2006 and "The Fabrication of Value Added Cement Products from Circulating Fluidized Bed Combustion Ash", Jewell R. B et al, World of Coal Ash (WOCA) Covington, Ky., USA, 2007) describes the $C_5S_2\$$ phase as being less reactive or inert and as undesirable. In addition, methods for avoiding this "undesirable phase" are highlighted on a regular basis. It was surprising to find during our experiments that a significant amount of this $C_5S_2\$$ phase reacts already within the first few days of hydration and significantly influences the phase composition of the hydrated samples.

The above object is thus solved by the production of a calcium sulfoaluminate clinker with the reactive $C_5S_2\$$ phase as a main component, in which this phase is formed in larger amounts by optimizing the sintering of the raw meal composition according to the selected raw materials and the composition of the raw meal mixture. The raw meal mixture is burned at least at 1200° C., preferably in the range of 1200° C. to 1350° C. and more preferably at 1250° C. to 1300° C., so as to further decompose any undesirable phases present/forming, such as those from the melilite group, and/or so as to convert crystalline high-temperature phases of different raw materials, such as melilite, mullite, pyroxene/clinopyroxene, spinel, etc., into the desired reactive phases of the clinker. A specific step, which differs significantly from the current prior art, is the subsequent selective tempering by controlling the temperature during a cooling phase in the kiln chamber as well as in the respective cooler system. Due to the selective temperature control during the cooling process, the burnt special clinker passes during cooling through a temperature range of 1200° C. to a lower limit of 750° C., preferably a range of 1150 to 850° C., for a period of time sufficient to form the clinker according to the invention, and is only then cooled rapidly. It has also been found that different aluminate and ferrate phases as well as relicts of the crystalline high-temperature phases of the raw materials, such as, for example but not exclusively, $C_4AF$, $C_2F$, $CF$, $C_3A$, $CA$, $CA_2$, $C_{12}A_7$, $A_3S_2$, $C_2AS$, etc., react with $C\$$ during the controlled cooling process during tempering and lead to an increase in the desired reactive $C_5S_2\$$ and $C_4A_3\$/C_4(A_xF_{1-x})_3\$$ phases, where x is from 0.1 to 1, preferably from 0.95 to 0.8.

Furthermore, possible uses for industrial byproducts are highlighted, which has the following advantages:
(1) prevention of landfills/waste dump material
(2) economical/ecological use of these materials;
(3) fixing/destruction of possible harmful substances.

EP 1 171 398 B1 describes the production of a special clinker in a temperature range of 900° C. to at most 1200° C., with a desired $C_5S_2\$$ (crystal Z) content of 5% to 75%. However, according to this document, the special clinker produced does not exhibit any cement-like behavior and has to be mixed with reactive hydraulic cement or cement of the Portland type so as to obtain desired physical properties, such as early hydration and high early strengths. The production process requires a limited temperature range of 900° C. to at most 1200° C. as well as selected raw materials, namely limestone, bauxites, aluminum-rich clays, sulfate carriers (anhydrite, gypsum and phosphogypsum) and calcium fluoride and/or raw materials having a high fluorine content, so as to obtain the desired reactive crystal Y phase. It is known to a person skilled in the art that fluorite, bauxite and aluminum-rich clays are very expensive raw materials and are only available in limited locations.

Alternative raw materials, such as industrial byproducts, which are used as components of the raw meal mixture of the hydraulically reactive clinker according to the invention, are not disclosed in EP 1 171 398 B1. It is also known to a person skilled in the art that crystalline high-temperature phases, which may occur typically in industrial byproducts, such as, for example but not exclusively, in ash and slag, such as, for example but not exclusively, representatives of the melilite and/or mullite group, are formed in a temperature range of 900° C. to 1200° C. and, within this range, are not normally converted into desired phases of the target clinker or are only converted very slowly and/or only in part.

Contrary to what is stated in EP 1 171 398 B1, only a small amount of ye'elimite can be formed at temperatures up to 1200° C., and only with use of specific raw materials (limestone, bauxite and sulfate-containing resources). The reactivity of the clinker according to the invention requires the presence of sufficient amounts of ternesite and ye'elimite; the lack of reactivity of the clinker obtained in accordance with EP 1 171 398 B1 is thus explained. To produce the necessary/desired amounts of this phase, the residence time in the hot zone at 1200° C. must accordingly be lengthened considerably. However, the optimum temperature for formation of $C_4A_3\$$ lies at ~1250° C.

A further disadvantage of the burning temperature range stated in EP 1 171 398 B1 consists in the presence/formation of crystalline high-temperature phases, such as $C_2AS$. This phase can remain practically unchanged/stable over a relatively long period of time at a maximum temperature of 1200° C., whereby a significant proportion of the aluminum is fixed undesirably. At temperatures above 1250° C., such undesired phases are generally reacted/converted more quickly. The economic and ecological value/use of various raw materials is thus increased significantly.

By contrast, the present invention describes various raw materials, a specific production method and the composition of an alternative, hydraulically reactive clinker, which differs considerably from the prior art.

A large number of natural, but also industrial materials, such as, for example but not exclusively, limestone, bauxite, clay/claystone, basalts, periodites, dunites, ingnimbrites, carbonatites, ash/slag/granulated blast furnace slag of high and low quality (mineralogy/glass content, reactivity, etc.), various waste dump materials, red and brown muds, natural sulfate carriers, sulfate plant muds, phosphogypsum, etc., can be used as raw material. Substances/substance groups that satisfy the minimum chemical requirements for potential raw materials but that are not explicitly named are also covered by the scope of protection.

Contrary to the special clinker described in EP 1 171 398 B1, the clinker produced in accordance with the invention, is highly hydraulically reactive (for example high heat flow, solidification accompanied by the formation of $AF_t$, $AF_m$, $C_2ASH_8$, C-(A)-S—H, etc.) when ground to a normal cement fineness, and exhibits clear cement-like behavior, even without the addition of other hydraulically reactive components. Such an addition is possible, however.

The methodology of the clinker production process also differs significantly, and no additional fluorine source is necessary for the production of the binder according to the invention, although the use of such a fluorine source is not necessarily ruled out. The present invention thus presents a significant extension to the usable industrial byproducts and waste materials.

In initial experiments, it was possible to produce different clinkers containing the $C_5S_2\$$ phase in varying amounts from limestones, clay, granulated blast furnace slag/lump slag and fly ash (W & V) of various quality. It was also found that the crystalline phases in limestones (for example diopside, etc.) as well as slag and ash (for example mullite, gehlenite, Åkermanite, augite, etc.) are converted into new phases (for example $C_4(A_xF_{1-x})_3\$$, $C_2S$, $C_4AF$, etc.) during the burning process at temperatures of more than 1200° C. and up to 1350° C., and also that the chemical and mineralogical composition of the raw meal mixture as well as the burning and cooling parameters have a significant influence on clinker composition and clinker reactivity.

The above object is therefore also solved by the use of materials of different qualities as raw materials for the production of a ternesite-belite-calcium sulfoaluminate (ferrite) clinker (TBC$A(F)) according to the invention as well as by a method for the production thereof with specific burning and cooling parameters.

The selective production of a calcium sulfoaluminate clinker containing $C_5S_2\$$ as a hydraulically reactive component as well as a selective cooling procedure for the formation and/or stabilization of specific phases, as described in this invention, are not disclosed in the prior art.

Raw materials that contain CaO, $Al_2O_3(\pm Fe_2O_3)$, $SiO_2$ and $SO_3$ as main components can be used for the clinkers according to the invention. An advantage is the possibility for use of industrial byproducts as at least one main component of the raw meal mixture. The following are particularly preferred:
1) industrial byproducts in particular of low quality (ash, slag, etc.);
2) materials which can replace limestone, at least in part, as the main CaO source;
3) materials which can replace bauxite, at least in part, as an $Al_2O_3(Fe_2O_3)$ source;
4) $SO_3$ from industrial processes,
5) natural rocks/rock glasses.

Materials such as industrial byproducts that are used as a main $Al_2O_3$ source should have an $Al_2O_3$ content of at least 5 wt %, preferably of ≥10 wt % and more preferably of ≥15 wt %. Where materials of low quality are mentioned hereinafter, this includes materials of any origin that meet the requirement in terms of the $Al_2O_3$ content. Lump slags and (W) ash are currently particularly preferred due to their availability.

The raw materials for the production of the ternesite-belite-calcium sulfoaluminate (ferrite) clinker (TBC$A(F)) according to the invention are ground to conventional finenesses in a manner known per se. Finenesses of 1500 to 10000 cm²/g according to Blaine, preferably of 2000 to 4000 cm²/g, are particularly well suited. The grinding fineness depends primarily on the type and composition of the raw material used, the burning process (temperature, residence time in the sintering zone, etc.) as well as the desired properties of the binder and the technical possibilities that are available.

The materials used can be natural products and/or industrial byproducts. These can be pre-treated, although this is not necessary.

The properties and composition of the clinker produced in accordance with the invention can be adjusted by the raw meal composition, the contents of correcting agents, the burning conditions and the control of the tempering/pre-cooling process, such that $C_5S_2\$$ and, instead of β-$C_2S$, reactive modifications of $C_2S$, for example α-modifications, are produced to an increased extent. The raw meal mixture must pass through a temperature of more than 1200° C. so that any undesired crystalline high-temperature phases (for example $C_2AS$) are converted into desired phases of the target clinker and a sufficient amount of $C_4(A_xFe_{1-x})_3\$$ is formed. However, this is accompanied by a considerable disadvantage. The desired $C_5S_2\$$ phase is not stable above a temperature greater than ±1180° C. and decomposes into $C_2S$ and C$. In accordance with the invention, the sintering process at more than 1200° C. is therefore combined with selective cooling of the clinker, which is slower compared to the normal time, over a range of 1200° C. to 750° C., preferably of 1150° C. to 850° C. and more preferably of 1150° C. to 1080° C., so as to selectively form $C_5S_2\$$ in addition to the $C_4(A_xFe_{1-x})_3\$$ phase. A further advantage of this temperature-control method has also surprisingly been found. If the $C_4(A_xFe_{1-x})_3\$$ phase (formed at at least above 1200° C.) selectively passes through a range of 1150° C. to 1050° C., it becomes measurably richer in iron due to the consumption/conversion for example of $C_4AF$, $C_2F$, CF, and increases slightly in terms of amount. This is evidenced by the quantitative decrease of iron-rich phases (for example $Fe_3O_4$, $C_2F$ and $C_4AF$), the increase in the $C_4A_3\$$ or $C_4(A_xFe_{(1-x)})_3\$$ phase, and the increase in the peak intensities and lattice parameter c (Å) [crystal system: orthorhombic] from 9.1610 [PDF number: 01-085-2210, tetracalcium hexaaluminate sulfate(VI)-$Ca_4(Al_6O_{12})(SO_4)$, ICSD Collection Code: 080361, Calculated from ICSD using POWD-12++, (1997), structure: Calos, N.J., Kennard, C. H. L., Whittaker, A. K., Davis, R. L., J. Solid State Chem., 119, 1, (1995)] to 9.1784 [PDF number: 00-051-0162, Calcium Aluminum Iron Oxide Sulfate-$Ca_4((Al_{0.95}Fe_{0.05}))_6O_{12}(SO_4)$, ICSD Collection Code: —, primary reference: Schmidt, R., Pöllmann, H., Martin-Luther-Univ., Halle, Germany., ICDD Grant-in-Aid, (1999)] to values greater than 9.2000. A potential solid solution crystal formation can also be established by determining the occupancy factors in a Rietveld refinement due to under-occupancies or mixed occupancies of individual atomic positions. Another purely qualitative indicator is the change in color of the clinkers, which in some instances is significant. The color of the clinkers which are subject to the two-stage method according to the invention thus changes, for example, from chestnut/ocher brown to green-brown all the way to a light gray hue.

The method according to the invention for producing a hydraulically reactive clinker by sintering a raw meal mixture containing sources for CaO, $Al_2O_3(Fe_2O_3)$, $SiO_2$ and $SO_3$ firstly comprises, as a first step, a conversion or sintering of the raw meal mixture in a temperature range of >1200° C. to 1350° C., preferably of 1250 to 1300° C., over a period of time sufficient to obtain an clinker intermediate product. The period is typically 10 min to 240 min, preferably 30 min to 90 min. The clinker intermediate product is then tempered in a temperature range of 1200° C. up to a lower limit of 750° C., preferably in a temperature range of 1150 to 850° C., over a period of time sufficient to obtain the desired amount of $C_5S_2\$$ as well as to convert a specific amount of aluminate and ferrate phases and residues of the crystalline high-temperature phases of the raw materials with remaining C$ into additional $C_4(A_xF_{1-x})_3\$$, where x is from 0.1 to 1, preferably from 0.95 to 0.8, and $C_5S_2\$$. The clinker should pass through the temperature range between 1200° C. and 1050° C. for a period of 10 min to 180 min, preferably of 25 min to 120 min and more preferably of 30 min to 60 min. During the cooling process, the clinker may pass through a range of 1050° C. to 750° C., preferably of 1050° C. to 850° C., for a period of 5 min to 120 min, preferably of 10 min to 60 min. The clinker is then cooled rapidly in a manner known per se, thus preventing further phase conversions.

In accordance with the invention, a clinker containing the main components $C_4(A_xF_{1-x})_3\$$, $(\alpha; \beta)$ $C_2S$ and $C_5S_2\$$ in the following proportions is thus obtained

- $C_5S_2\$$ 5 to 75 wt %, preferably from 10 to 60 wt % and more preferably from 20 to 40 wt %
- $C_2S$ 1 to 80 wt %, preferably from 5 to 70, more preferably from 10 to 65 wt % and most preferably from 20 to 50 wt %
- $C_4(A_xF_{1-x})_3\$$ 5 to 70 wt %, preferably from 10 to 60 wt % and more preferably from 20 to 45 wt %
- secondary phases 0 to 30 wt %, preferably 5 to 25 wt % and more preferably from 10 to 20 wt %.

The designation $(\alpha, \beta)$ $C_2S$ denotes polymorphs of $C_2S$ and the mixtures thereof, wherein the reactive $\alpha$ polymorphs (for example $\alpha$, $\alpha'_L$, $\alpha'_H$) are preferred. In the $C_4(A_xF_{1-x})_3\$$ phase, x is in the range of 0.1 to 1, preferably in the range of 0.95 to 0.8.

The ratios by weight of the most important phases of the clinker according to the invention ($C_4(A_xF_{1-x})_3\$$, $(\alpha; \beta)C_2S$, $C_5S_2\$$) preferably lie in the following ranges:

- $C_4(A_xF_{1-x})_3\$$ to $(\alpha; \beta)C_2S=1:16-70:1$, preferably 1:8-8:1 and more preferably 1:5-5:1
- $C_4(A_xF_{1-x})_3\$$ to $C_5S_2\$=1:15-14:1$, preferably 1:8-8:1 and more preferably 1:5-5:1
- $C_5S_2\$$ to $(\alpha; \beta)C_2S=1:15-70:1$, preferably 1:8-10:1 and more preferably 1:4-5:1
- $C_4(A_xF_{1-x})_3\$$ to $((\alpha; \beta)C_2S+C_5S_2\$)=1:16-10:1$, preferably 1:8-8:1 and more preferably 1:4-4:1

The clinker obtained in accordance with the invention is then processed further, similarly to the known clinkers, to form cement or binder mixtures.

Natural raw materials, such as limestone, bauxite, clay/claystone, basalt, kimberlite, ingnimbrite, carbonatite, anhydrite, gypsum, etc. and/or industrial byproducts and residual materials, such as waste dump and landfill materials, ash and slag of both high and low quality, ceramic residues, sulfate plant muds and/or phosphogypsum are selected as sources for CaO, $Al_2O_3(Fe_2O_3)$, $SiO_2$ and $SO_3$ for the raw meal mixture.

For the clinker phase, the reference $Al_2O_3(Fe_2O_3)$ means that aluminum can be replaced in part by iron, as is the case in the designation $C_4(A_xF_{1-x})_3\$$, where x is from 0.1 to 1, preferably from 0.95 to 0.8. Aluminum is typically present primarily with low additions of iron, but considerable amounts of iron up to a predominant content of iron can be used within the scope of the invention.

Bauxite, clay and/or industrial byproducts and residual materials with an $Al_2O_3$ content of at least 5 wt %, preferably ≥10 wt % and more preferably ≥5 wt %, have proven to be of value as $Al_2O_3(Fe_2O_3)$ sources.

Selected raw materials, such as, for example but not exclusively, ashes, have surprisingly proven to be particularly suitable. They demonstrated, on average, an increased phosphate content of >1.0 wt % and led to formation of a significant amount of very reactive $C_5S_2\$$, even with a relatively short residence time in a temperature range of <1200° C. to 850° C.

The secondary phases, for example calcium silicates, sulfates, calcium aluminates, spinels, representatives of the melilite group, periclase, free lime, quartz and/or a glass phase, are preferably present in a proportion of 0.01 wt % to 30 wt %, preferably of 5 wt % to 20 wt % and more preferably of 10 wt % to 15 wt %. The type and amount of one or more secondary phases in relation to the main components can be controlled by the ratios by weight of $CaO/Al_2O_3(\pm Fe_2O_3)$, $CaO/SiO_2$ and by the proportion of the sulfate carrier in the raw meal mixture. A preferred secondary phase is $C_2A_yF_{1-y}$, where y is from 0.2 to 0.8, preferably from 0.4 to 0.6, specifically in the form $C_4AF$, which is preferably present in an amount of 3 to 30 wt %, more preferably of 5 to 25 wt % and most preferably of 10 to 20 wt %.

The contents of the main oxides of the clinker preferably comprise the following ranges:

| | |
|---|---|
| CaO | 35 to 65 wt % |
| $Al_2O_3(Fe_2O_3)$ | 7 to 45 wt % |
| $SiO_2$ | 5 to 28 wt % |
| $SO_3$ | 5 to 20 wt %. |

It is advantageous if the clinker according to the invention has a periclase content of >2 wt %. In addition, the clinker may contain one or more secondary elements and/or compounds thereof from the group of the alkaline and alkaline earth metals and/or the transition metals and/or the metals and/or the semi-metals and/or the non-metals in a proportion of up to 20 wt %, preferably of ≤15 wt % and more preferably of ≤10 wt %.

It has been found that industrial byproducts and process dusts are well-suited as correcting agents for adjustment of the raw meal mixture.

For production of cement or binder mixtures, the clinker is ground in a manner known per se, either with or without sulfate carriers, to conventional cement finenesses (according to Blaine) of 2000 to 10000 $cm^2/g$, preferably of 3000 to 6000 $cm^2/g$ and more preferably of 4000 to 5000 $cm^2/g$. Alkaline and/or alkaline earth sulfates, preferably in the form of gypsum and/or hemihydrate and/or anhydrite, are particularly suitable sulfate carriers.

The ground clinker can be combined with one other substance or with a mixture of other substances, such as, for example but not exclusively, with Portland cement, geopolymer binder, calcium aluminate cement, artificial and natural pozzolanes/latently hydraulic materials, limestone meals, etc. or a plurality thereof, to form a binder mixture. However, contrary to EP 1 171 398 B1, this is not necessary to achieve a usable level of hydraulic reactivity, and instead the clinker itself ground to cement exhibits the desired level of hydraulic reactivity.

In the presence of water, the cement forms $AF_t$ and $AF_m$ phases as well as $Al(OH)_3$. On the one hand, the continuous dissolution of the $C_5S_2\$$ phase results in additional sulfate, which in turn stabilizes $AF_t$ and prevents/reduces a possible transformation to $AF_m$, and on the other hand a reactive form of $C_2S$ is released, which can react with water, but also with the available $Al(OH)_3$ and can form $C_2AS.8H_2O$ (stratlingite) as well as (N,C)-(A)-S—H. The stabilization of $AF_t$ and the consumption of $Al(OH)_3$ as well as the reduction in porosity by the formation of $C_2AS.8H_2O$ and (N,C)-(A)-S—H of the cement according to the invention results in a marked improvement in durability, such as, for example but not exclusively, by the reduction in overall porosity and/or the connected pore space and the resistance to a possible sulfate attack.

When processing the cement according to the invention or a binder containing said cement, a water/binder value of 0.2 to 2 is suitable, preferably of 0.4 to 0.8 and more preferably of 0.5 to 0.72.

The cement or the binder mixture produced therefrom may contain one or more admixtures. It preferably contains one or more setting and/or hardening accelerators, preferably selected from lithium salts and hydroxides, other alkali salts and hydroxides, alkali silicates, Portland cement and calcium aluminate cement. It is further preferred if concrete plasticizers and/or plasticizing admixtures are contained, preferably on the basis of ligninosulfonates, sulfonated naphthalene formaldehyde condensate, melamine formaldehyde condensate or phenol formaldehyde condensate, or on the basis of acrylic acid/acrylamide mixtures or polycarboxylate ethers, or on the basis of phosphated polycondensates.

The cement or the binder mixture produced therefrom is excellently suited for solidifying hazardous waste. In this connection a content of adsorptively effective additives, such as zeolites and/or ion-exchange resins, is preferred. A high pH value, which promotes the formation of poorly soluble hydroxides, can be advantageous for immobilizing heavy metals in inorganic binders. This can be implemented, for example but not exclusively, by mixing the clinker according to the invention with Portland cement in a binder.

A further advantage of the cement according to the invention or of the binder mixture produced therefrom is the formation of different phases during hydration (for example ettringite $[AF_t]$, monophases $[AF_m]$, metal-metal hydroxyl salts [LDH], etc.), which incorporate in their structure various heavy metals as well as other harmful substances (for example chlorides, etc.) and can thus permanently fix them.

The invention will be explained on the basis of the following examples, without being limited to the specific embodiments described. Unless indicated otherwise or unless the context automatically stipulates to the contrary, the percentages are based on weight; if in doubt then on the total weight of the mixture.

The invention also relates to all combinations of preferred embodiments, provided they are not mutually exclusive. When used in conjunction with a numerical value, the expressions "around" or "approximately" mean that values that are higher or lower by at least 10% or values that are higher or lower by 5% and, in any case, values that are higher or lower by 1%, are included.

BRIEF DESCRIPTION OF THE DRAWINGS

FIGS. 1a and 1b show the specific and cumulative heat flow of cement pastes M1 and M1a;

FIGS. 2a and 2b show the specific and cumulative heat flow of cement paste M2;

FIGS. 3a and 3b show the specific and cumulative heat flow of cement pastes L1, L1a and L1b;

FIGS. 4a and 4b show the specific and cumulative heat flow of cement pastes L2 and L2a;

FIGS. 5a and 5b show the specific and cumulative heat flow of cement pastes L3 and L3a;

FIG. 6 shows the dependence of the lattice parameters on synthesis temperature and on the specific cooling program and on $SO_3$ content;

FIG. 7 shows the specific heat flow of cement pastes from example 6.

EXAMPLES

In table 3, the raw materials used and with which the examples described hereinafter were carried out are characterized on the basis of the oxidic main components and degree of fineness thereof. The loss of weight after tempering at 1050° C. is also indicated. Table 4 shows the mineralogical phase composition of the industrial byproducts used.

All clinkers were sintered for 1 h at 1250° C. and, as a comparison, were then either cooled directly to room temperature or underwent a defined cooling program in the kiln in accordance with the invention for tempering and were only then cooled to room temperature.

TABLE 3

Elemental composition of the raw materials used (RFA)

| | | Limestone | Slags | | | Ashes Sample | | | Sulfate Carrier | Al corr. | Metakaolin |
|---|---|---|---|---|---|---|---|---|---|---|---|
| RFA | Unit | K1 | S1 | S2 | S3 | FA1 | FA2 | FA3 | MicroA | $Al(OH)_3$ | MK |
| GV 1050° C. | % | 43.09 | 0.00 | 0.00 | 1.15 | 3.48 | 0.82 | 2.79 | 4.64 | 34.64 | 1.91 |
| $SiO_2$ | % | 1.53 | 36.82 | 43.42 | 35.46 | 35.70 | 28.50 | 47.30 | 4.17 | 0.00 | 48.00 |
| $Al_2O_3$ | % | 0.35 | 11.72 | 11.40 | 12.99 | 21.8 | 12.5 | 27.70 | 1.36 | 65.36 | 41.60 |
| TiO2 | % | 0.03 | 0.88 | 0.64 | 0.70 | 1.21 | 1.05 | 1.38 | 0.04 | 0.00 | |
| MnO | % | 0.01 | 0.37 | 1.05 | 0.62 | 0.03 | 0.18 | 0.06 | 0.00 | 0.00 | |
| $Fe_2O_3$ | % | 0.19 | 0.52 | 1.43 | 0.26 | 6.22 | 5.18 | 6.29 | 0.37 | 0.00 | 1.80 |
| CaO | % | 54.50 | 38.61 | 37.36 | 37.81 | 25.80 | 37.4 | 7.84 | 37.40 | 0.00 | 5.70 |
| MgO | % | 0.22 | 7.75 | 2.62 | 7.74 | 1.34 | 4.81 | 2.31 | 1.82 | 0.00 | 0.10 |
| $K_2O$ | % | 0.04 | 0.44 | 0.36 | 0.74 | 0.13 | 0.28 | 1.46 | 0.28 | 0.00 | 0.95 |
| $Na_2O$ | % | 0.00 | 0.18 | 0.38 | 0.75 | 0.07 | 0.07 | 0.59 | 0.06 | 0.00 | |
| $SO_3$ | % | 0.01 | 2.70 | 1.11 | 1.58 | 3.96 | 7.71 | 0.29 | 49.80 | 0.00 | |
| $P_2O_5$ | % | 0.01 | 0.00 | 0.01 | 0.00 | 0.15 | 1.27 | 1.77 | 0 | 0.00 | |
| Total | | 99.98 | 100.00 | 99.78 | 99.80 | 99.89 | 99.77 | 99.78 | 99.94 | 100.00 | 100.06 |

TABLE 3-continued

Elemental composition of the raw materials used (RFA)

| | | Raw Material | | | | | | | | |
|---|---|---|---|---|---|---|---|---|---|---|
| | | Limestone | Slags | | | Ashes Sample | | | Sulfate Carrier | Al corr. | Metakaolin |
| RFA | Unit | K1 | S1 | S2 | S3 | FA1 | FA2 | FA3 | MicroA | Al(OH)$_3$ | MK |
| Amorphous | % | / | / | >95 | | 48.0 | 38.0 | 58.9 | / | / | |
| Density | g/cm$^3$ | 2.64 | 2.82 | 2.82 | 2.81 | 2.59 | 2.82 | 2.3 | | | 2.54 |
| Grinding Fineness acc. to Blaine | cm$^2$/g | 3350 | 4700 | 3710 | 3900 | 6380 | 4380 | 4270 | | | |

TABLE 4

Mineralogical phase composition of the industrial byproducts used (QXRD according to Rietveld)

| | | Raw Material | | | | | |
|---|---|---|---|---|---|---|---|
| | | Slags | | | Ashes Sample | | |
| Mineral | Unit | S1 | S2 | S3 | FA1 | FA2 | FA3 |
| Calcite | wt % | | | 1.2 | 1.6 | | |
| Quartz | wt % | 0.5 | 0.25 | | 7.5 | 11.5 | 9.8 |
| Cristobalite | wt % | | | 1.2 | 0.4 | | |
| Free lime | wt % | | | 2.4 | 9.3 | | 0.9 |
| Periclase | wt % | | | | | 2.8 | 1.1 |
| Anhydrite | wt % | | | 4.5 | 10.4 | | 0.6 |
| Feldspars | wt % | | | 8.0 | | | |
| Åkermanite | wt % | 56.0 | | 18.3 | | | |
| Gehlenite | wt % | 26.8 | | 8.9 | 8.9 | 6.3 | |
| Merwinite | wt % | | 0.4 | 3.1 | | 4.9 | |
| Augite | wt % | 14.6 | | | | | |
| Mullite | wt % | 0.8 | | | 3.6 | | 25.1 |
| Maghemite | wt % | | 0.14 | | 1.8 | 1.2 | 1.4 |
| Hematite | wt % | | | | 2.4 | 0.9 | 0.8 |
| Rutile | wt % | | | | | | 0.3 |
| Perovskite | wt % | | | 2.4 | | | |
| Ye'elimite | wt % | | | | 1.2 | 3.1 | |
| C$_2$S | wt % | | | | 6.5 | 8.1 | 1.1 |
| C$_4$AF | wt % | | | | | 3.1 | |
| C$_5$S$_2$$ | wt % | 1.3 | | | | | |
| Amorphous | wt % | 0.00 | 99.21 | 68.5 | 48.0 | 38.0 | 58.9 |

Example 1

The raw mixture consisted of 44 wt % K1+25 wt % FA1+sulfate carrier and Al(OH)$_3$. After sintering, a sample (M1) was cooled directly; the second sample (M1a) underwent a cooling program for tempering after sintering, in which the temperature was lowered from 1200° C. to 850° C. over ~45 minutes, and the clinker was then cooled rapidly by exposure to air.

Example 2

The raw mixture consisted of 65 wt % (80% K1/20% MK)+5 wt % FA3+sulfate carrier and Al(OH)$_3$. After sintering, the sample (M2) underwent the same cooling program as M1a and was then cooled.

Example 3

The raw mixture consisted of 45 wt % K1+35 wt % S2+sulfate carrier and Al(OH)$_3$. After sintering, a sample (L1) was cooled directly; the second sample (L1a) underwent the same cooling program as M1a after sintering and was then cooled; the third sample (L1b) underwent a cooling program after sintering in which the temperature was lowered from 1150° C. to 1100° C. over ~60 minutes, and the clinker was then cooled rapidly by exposure to air.

Example 4

The raw mixture consisted of 37 wt % K1+54 wt % FA2+sulfate carrier and Al(OH)$_3$. After sintering, a sample (L2) was cooled directly; the second sample (L2a) underwent the same cooling program as L1b after sintering and was then cooled.

Example 5

The raw mixture consisted of 41 wt % K1+41 wt % S1+sulfate carrier and Al(OH)$_3$. After sintering, a sample (L3) was cooled directly; the second sample (L3a) underwent the same cooling program as M1a after sintering and was then cooled.

The analysis results for the clinkers and the hardened cement pastes, which were produced from a mixture of 85 wt % of the clinker and 15 wt % of anhydrite with a water/cement value of 0.7, are summarized in Table 5. Heat flow measurements for the cements are illustrated in FIGS. 1 to 5.

TABLE 5

QXRD data (according to Rietveld) for the clinkers and the hardened cement pastes produced therefrom

| | Clinker | | | Hardened cement paste | | | | | | | |
|---|---|---|---|---|---|---|---|---|---|---|---|
| | | | | physically bonded | chemically | | | | | | |
| Sample | C$_2$S [wt %] | C$_4$(A$_x$F$_{(1-x)}$)$_3$$ [wt %] | C$_5$S$_2$$ [wt %] | water (40° C.) [wt %] | bonded water [wt %] | C$_2$S [wt %] | C$_4$(A$_x$F$_{(1-x)}$)$_3$$ [wt %] | C$_5$S$_2$$ [wt %] | AFt [wt %] | C$_2$ASH$_8$ [wt %] | amorphous [wt %] |
| M1 | 45 | 39 | 1 | 14 | 30.8 | 20 | — | — | 35 | 2 | 39 |
| M1a | 42 | 42 | 5 | 12.8 | 31.8 | 14 | — | — | 26 | 5 | 51 |

TABLE 5-continued

QXRD data (according to Rietveld) for the clinkers and the hardened cement pastes produced therefrom

| | Clinker | | | Hardened cement paste | | | | | | | |
|---|---|---|---|---|---|---|---|---|---|---|---|
| | | | | physically bonded | chemically | | | | | | |
| Sample | $C_2S$ [wt %] | $C_4(A_xF_{(1-x)})_3\$$ [wt %] | $C_5S_2\$$ [wt %] | water (40° C.) [wt %] | bonded water [wt %] | $C_2S$ [wt %] | $C_4(A_xF_{(1-x)})_3\$$ [wt %] | $C_5S_2\$$ [wt %] | AFt [wt %] | $C_2ASH_8$ [wt %] | amorphous [wt %] |
| M2 | 23 | 44 | 26 | 18.6 | 25.8 | 30 | — | 12 | 22 | — | 32 |
| L1 | 59 | 21 | 2 | 24 | 21.4 | 34 | — | — | 27 | — | 24 |
| L1a | 58 | 22 | 2 | 23.4 | 22.6 | 34 | — | — | 31 | — | 24 |
| L1b | 46 | 22 | 19 | 23.6 | 22.1 | 27 | — | 7 | 29 | — | 26 |
| L2 | 30 | 23 | 31 | 25.9 | 18.8 | 24 | — | 17 | 29 | — | 19 |
| L2a | 20 | 24 | 42 | 26.2 | 19.2 | 15 | — | 26 | 28 | — | 19 |
| L3 | 63 | 22 | 1 | 24.6 | 19.6 | 46 | — | 1 | 30 | — | 6 |
| L3a | 55 | 23 | 12 | 24.9 | 19.0 | 40 | — | 4 | 29 | — | 11 |

Example 6

The raw mixture consisted of 52.5 wt % $CaCO_3$ (Merck, analytical grade)+32.6 wt % FA2+MicroA and $Al(OH)_3$. After sintering at 1250° C., two samples (CSAB1250_a and b) were cooled quickly and directly by exposure to air; two further samples (CSAB1100_a and b) were cooled in the kiln to 1100° C. after sintering at 1250° C. and were kept at this temperature for 1 h and were then cooled quickly and directly by exposure to air. The sulfate content of the raw meal was increased in two further samples (CSAB1100-SO3_a and b), then these samples underwent the same sintering and cooling program as CSAB1100_a and b. Table 6 lists the lattice parameters and compositions determined for the clinkers obtained. FIG. 6 shows the dependence of the lattice parameters on synthesis temperature and on the specific cooling program and on $SO_3$ content.

The clinker composition can be optimized and varied by optimizing the $SO_3/(Al_2O_3+Fe_2O_3)$ ratios and by use of the specific production method (see Table 6). The increasing incorporation of iron into the structure of ye'elimite correlates with the increase of the lattice parameters. Likewise, cubic modification instead of orthorhombic modification occurs during iron incorporation.

FIG. 7 shows the heat flow of hardened cement pastes formed from mixtures of 90% of the clinkers with 10% MicroA and of the pure clinker CSAB1100-SO3_b with a w/c value of 0.6. Clinkers produced in accordance with the two-stage method according to the invention and having an optimized mineralogical composition clearly react/hydrate earlier. Experiments have shown that this is accompanied by a significant increase in early strength.

TABLE 6

Mineralogical clinker composition according to QXRD (Rietveld)

| | Clinker | | | | | |
|---|---|---|---|---|---|---|
| Phases | CSAB1250_a | CSAB1250_b | CSAB1100_a | CSAB1100_b | CSAB1100SO3_a | CSAB1100SO3_b |
| $C_4A_3\$$ ortho | 12.8 | 12.6 | 10.3 | 10.5 | 9.2 | 2.4 |
| $C_4A_3\$$ cub | 13.8 | 13.8 | 15.7 | 16.5 | 20.1 | 21.4 |
| $\Sigma C_4A_3\$$ | 26.5 | 26.4 | 26.0 | 27.0 | 29.3 | 23.8 |
| $\alpha\text{-}C_2S$ | 0.8 | 1.0 | 1.6 | 2.1 | 1.9 | 1.3 |
| $\beta\text{-}C_2S$ | 54.2 | 51.5 | 50.2 | 50.6 | 53.2 | 15.8 |
| $\gamma\text{-}C_2S$ | 3.8 | 5.8 | 5.1 | 5.0 | 0.0 | 0.0 |
| $\Sigma C_2S$ | 58.8 | 58.2 | 56.8 | 57.6 | 55.2 | 17.1 |
| $C_5S_2\$$ | 0.0 | 0.0 | 0.8 | 0.8 | 5.2 | 49.7 |
| $C_4AF$ | 7.2 | 6.7 | 6.7 | 6.6 | 2.7 | 1.3 |
| Minors | 7.5 | 8.7 | 9.6 | 8.0 | 7.7 | 8.3 |
| Total | 100.0 | 100.0 | 100.0 | 100.0 | 100.0 | 100.0 |
| $SO_3/(Al_2O_3 + Fe_2O_3)$ | 0.25 | 0.25 | 0.25 | 0.25 | 0.40 | 0.91 |
| $\alpha\ C_4A_3\$$ cub | 9.198 | 9.199 | 9.199 | 9.200 | 9.205 | 9.207 |
| $c\ C_4A_3\$$ ortho | 9.149 | 9.150 | 9.150 | 9.150 | 9.174 | 9.182 |

The invention claimed is:

1. A method for producing a hydraulically reactive clinker by sintering a raw meal mixture, which contains sources for CaO, $Al_2O_3(Fe_2O_3)$, $SiO_2$ and $SO_3$, wherein
the raw meal mixture is sintered in a temperature range of >1200° C. to 1350° C. over a period of time sufficient to convert the raw meal mixture into a clinker intermediate product,
the clinker intermediate product is tempered in a temperature range of 1200° C. to a lower limit of 750° C. over a period of time sufficient to obtain 5 to 75 wt % of $C_5S_2\$$ and to convert an amount of aluminate and ferrate phases and residues of crystalline high-temperature phases of the raw meal mixture with remaining C$ into additional $C_4(A_xF_{1-x})_3\$$ and $C_5S_2\$$, and
the clinker comprising main components $C_4(A_xF_{1-x})_3\$$, ($\alpha$; $\beta$) $C_2S$, and $C_5S_2\$$ in the following proportions

| | |
|---|---|
| $C_5S_2\$$ | 5 to 75 wt % |
| $C_2S$ | 1 to 80 wt % |

| | |
|---|---|
| $C_4(A_xF_{1-x})_3\$$ | 5 to 70 wt % |
| one or more secondary phases | 0 to 30 wt %, | wherein x is a number from 0.1 to 1, is cooled.

2. The method according to claim 1, wherein natural raw materials selected from the group consisting of limestone, bauxite, clay/claystone, basalt, kimberlite, dunite, periodite, ingnimbrite, carbonatite, anhydrite, gypsum, and mixtures thereof,
and/or industrial byproducts selected from the group consisting of waste dump materials, red mud, brown mud, landfill materials, ash, slag, ceramic residues, sulfate plant muds, phosphogypsum, and mixtures thereof are selected as sources for CaO, $Al_2O_3(Fe_2O_3)$, $SiO_2$ and $SO_3$ for the raw meal mixture.

3. The method according to claim 2, wherein bauxite, clay and/or industrial byproducts and residual materials having an $Al_2O_3$ ($Fe_2O_3$) content of at least 5 wt is/are selected as an $Al_2O_3(Fe_2O_3)$ source.

4. The method according to claim 1, wherein a type and amount of one or more secondary phases are controlled by ratios by weight of $CaO/Al_2O_3(Fe_2O_3)$, $CaO/SiO_2$ and by a proportion of a sulfate carrier in the raw meal mixture.

5. The method according to claim 1, wherein the hydraulically reactive clinker contains one or more secondary elements and/or compounds thereof selected from the group consisting of alkaline and alkaline earth metals, transition metals, metals, semi-metals, and non-metals in a proportion up to 20 wt %.

6. The method according to claim 1, wherein industrial byproducts and process dusts are used as correcting agents for adjustment of an amount of CaO, $Al_2O_3(Fe_2O_3)$, $SiO_2$ and $SO_3$ and ratios by weight of $CaO/Al_2O_3(Fe_7O_3)$ and $CaO/SiO_2$ in the raw meal mixture.

7. The method according to claim 1, wherein the raw meal mixture is ground to finenesses (according to Blaine) of 1500 to 10000 $cm^2/g$.

8. The method according to claim 1, wherein the raw meal composition, a content of correcting agents, the burning conditions, and regulation of the tempering process are selected in such a way that $C_5S_2\$$ and, instead of $\beta$-$C_2S$, reactive modifications of $C_2S$ are produced to an increased extent.

9. The method according to claim 1, wherein the clinker is ground to finenesses (according to Blaine) of 2000 to 10000 $cm^2/g$, either with or without sulfate carriers in the form of alkaline and/or alkaline earth sulfates.

10. The method according to claim 1, wherein the one or more secondary phases are calcium silicates, sulfates, calcium aluminates, spinels, representatives of the melilite group, periclase, free lime, or a glass phase, and the one or more secondary phases are present in an amount of 0.1 to 30 wt %.

11. The method according to claim 4, wherein the one or more secondary phases are present in an amount of 5 to 15 wt %.

12. The method according to claim 10, wherein the one or more secondary phases are present in an amount of 5 to 15 wt %.

13. The method according to claim 7, wherein the fineness ranges from 2000 to 4000 $cm^2/g$.

14. The method according to claim 9, wherein the fineness ranges from 3000 to 6000 $cm^2/g$.

15. The method according to claim 14, wherein the fineness ranges from 4000 to 5000 $cm^2/g$.

16. The method according to claim 1, wherein the raw meal mixture is sintered over a period of 10 to 240 minutes.

17. The method according to claim 1, wherein the raw meal mixture is tempered over a period of 15 to 30 minutes.

18. The method according to claim 16, wherein the raw meal mixture is tempered over a period of 15 to 30 minutes.

19. The method according to claim 4, wherein the one or more secondary phases are calcium silicates, sulfates, calcium aluminates, spinels, representatives of melilite group, periclase, free lime, quartz or a glass phase, and the one or more secondary phases are present in an amount of 0.1 to 30 wt %.

20. The method according to claim 3, wherein the $Al_2O_3$ ($Fe_2O_3$) content is at least 10 wt. %.

21. The method according to claim 5, wherein the $Al_2O_3$ ($Fe_2O_3$) content is at least 15 wt. %.

22. The method according to claim 5, wherein the one or more secondary elements and/or compounds thereof are contained in a proportion of $\leq 15$ wt. %.

23. The method according to claim 5, wherein the one or more secondary elements and/or compounds thereof are contained in a proportion of $\leq 10$ wt. %.

24. The method according to claim 1, wherein during the cooling the clinker passes through the temperature range between 1200° C. and 1050° C. for a period of 25 min to 120 min.

25. The method according to claim 24, wherein during the cooling the clinker passes through a range of 1050° C. to 750° C. for a period of 5 min. to 120 min. before being cooled rapidly.

26. The method according to claim 1, wherein the clinker intermediate product is tempered in a temperature range of 1200° C. to a lower limit of 750° C. over a period of time sufficient to obtain at least 10 wt % of $C_5S_2\$$.

27. The method according to claim 1, wherein the clinker intermediate product is tempered in a temperature range of 1200° C. to a lower limit of 750° C. over a period of time sufficient to obtain at least 20 wt % of $C_5S_2\$$.

28. The method according to claim 24, wherein the clinker intermediate product is tempered in a temperature range of 1200° C. to a lower limit of 750° C. over a period of time sufficient to obtain at least 20 wt % of $C_5S_2\$$.

29. The method according to claim 25, wherein the clinker intermediate product is tempered in a temperature range of 1200° C. to a lower limit of 750° C. over a period of time sufficient to obtain at least 20 wt % of $C_5S_2\$$.

* * * * *